US011308639B2

(12) United States Patent
Botonjic et al.

(10) Patent No.: US 11,308,639 B2
(45) Date of Patent: Apr. 19, 2022

(54) TOOL AND METHOD FOR ANNOTATING A HUMAN POSE IN 3D POINT CLOUD DATA

(71) Applicant: Volvo Car Corporation, Gothenburg (SE)

(72) Inventors: Saudin Botonjic, Gothenburg (SE); Sihao Ding, Mountain View, CA (US); Andreas Wallin, Billdal (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/692,901

(22) Filed: Nov. 22, 2019

(65) Prior Publication Data

US 2020/0294266 A1 Sep. 17, 2020

Related U.S. Application Data

(60) Provisional application No. 62/817,400, filed on Mar. 12, 2019.

(51) Int. Cl.
*G06T 7/73* (2017.01)
*G06T 15/20* (2011.01)
*G06T 19/00* (2011.01)

(52) U.S. Cl.
CPC ............... *G06T 7/73* (2017.01); *G06T 15/20* (2013.01); *G06T 19/00* (2013.01);
(Continued)

(58) Field of Classification Search
CPC ...... G06F 3/011; G06K 9/4628; G06K 9/627; G06K 9/6267; G06K 9/00805; G06K 9/00335; G06K 9/00342; G06K 9/00369; G06K 9/00791; G06K 9/6256; G01S 7/4802; G01S 7/4808; G01S 17/04; G01S 17/42; G01S 17/86; G01S 17/89; G01S 17/931; G06T 7/174; G06T 7/12; G06T 7/62; G06T 7/73; G06T 7/74; G06T 7/75; G06T 15/08; G06T 15/20; G06T 19/00;
(Continued)

(56) References Cited

U.S. PATENT DOCUMENTS 10,282,663 B2 5/2019 Socher et al.
10,451,405 B2 10/2019 Clayton et al.
(Continued)

FOREIGN PATENT DOCUMENTS

CN 108898063 A 11/2018

OTHER PUBLICATIONS

Haque, Albert, et al. "Towards viewpoint invariant 3d human pose estimation." European Conference on Computer Vision. Springer, Cham, 2016 (Year: 2016).*

(Continued)

*Primary Examiner* — Diane M Wills
(74) *Attorney, Agent, or Firm* — Shumaker & Sieffert, P.A.

(57) ABSTRACT

A method and apparatus for annotating point cloud data. An apparatus may be configured to cause display of the point cloud data, label points in the point cloud data with a plurality of annotation points, the plurality of annotation points corresponding to points on a human body, move, in response to a user input, one or more of the annotation points to define a human pose and create annotated point cloud data, and output the annotated point cloud data.

20 Claims, 15 Drawing Sheets

(52) U.S. Cl.
CPC .... *G06T 2200/24* (2013.01); *G06T 2207/10028* (2013.01); *G06T 2207/20081* (2013.01); *G06T 2207/20084* (2013.01); *G06T 2207/20101* (2013.01); *G06T 2207/20132* (2013.01); *G06T 2207/30196* (2013.01); *G06T 2219/004* (2013.01)

(58) Field of Classification Search
CPC ....... G06T 2200/24; G06T 2207/10028; G06T 2207/10072; G06T 2207/20081; G06T 2207/20084; G06T 2207/20101; G06T 2207/20132; G06T 2207/30196; G06T 2207/30252; G06T 2219/004; G05D 1/0088; G05D 1/0221; G05D 1/0248; G06N 20/00

See application file for complete search history.

(56) References Cited

U.S. PATENT DOCUMENTS

| | | |
|---|---|---|
| 2007/0174769 A1 | 7/2007 | Nycz |
| 2014/0139629 A1 | 5/2014 | Baiyya et al. |
| 2016/0203525 A1 | 7/2016 | Hara et al. |
| 2017/0041677 A1* | 2/2017 | Anderson ............. G06F 40/169 |
| 2017/0337732 A1 | 11/2017 | Tamersoy et al. |
| 2018/0089536 A1 | 3/2018 | Feng et al. |
| 2018/0144496 A1 | 5/2018 | Posner et al. |
| 2018/0222050 A1 | 8/2018 | Vu et al. |
| 2018/0275277 A1 | 9/2018 | Li et al. |
| 2018/0364717 A1 | 12/2018 | Douillard et al. |
| 2019/0050685 A1 | 2/2019 | Kaminski et al. |
| 2019/0147372 A1 | 5/2019 | Luo et al. |
| 2019/0304134 A1 | 10/2019 | Mauchly et al. |
| 2020/0134911 A1 | 4/2020 | van Hoff et al. |
| 2020/0150233 A1 | 5/2020 | Nian et al. |
| 2021/0049780 A1* | 2/2021 | Westmacot ............... G06T 7/12 |

OTHER PUBLICATIONS

Quan Nguyen and Michael Kipp. "Annotation of human gesture using 3d skeleton controls". In LREC, 2010 (Year: 2010).*

Simon T, Joo H, Matthews I, Sheikh Y. "Hand keypoint detection in single images using multiview bootstrapping". In Proceedings of the IEEE conference on Computer Vision and Pattern Recognition 2017 (pp. 1145-1153) (Year: 2017).*

Yuan S, Ye Q, Garcia-Hernando G, Kim TK. "The 2017 hands in the million challenge on 3d hand pose estimation". arXiv preprint arXiv:1707.02237. Jul. 7, 2017. (Year: 2017).*

Chang, Ju Yong, and Seung Woo Nam. "Fast Random-Forest-Based Human Pose Estimation Using a Multi-scale and Cascade Approach." ETRI Journal 35.6 (2013): 949-959. (Year: 2013).*

Schulz et al., "Pedestrian Intention Recognition using Latent-dynamic Conditional Random Fields," https://ieeexplore.ieee.org/xpl/conhome/7180136/proceeding, Jun. 28-Jul. 1, 2015, 6 pp.

Schneemann et al., "Context-based Detection of Pedestrian Crossing Intention for Autonomous Driving in Urban Environments," 2016 IEEE/RSJ International Conference on Intelligent Robots and Systems (IROS), Oct. 9-14, 2016, pp. 2243-2248.

Kohler et al., "Stereo-Vision-Based Pedestrian's Intention Detection in a Moving Vehicle," 2015 IEEE 18th International Conference on Intelligent Transportation Systems, 2015 IEEE 18th International Conference on Intelligent Transportation Systems, Sep. 15-18, 2015, pp. 2317-2322.

Fang et al., "On-Board Detection of Pedestrian Intentions," Sensors, vol. 17, No. 10, Sep. 23, 2017, 14 pp.

Kohler et al., "Early Detection of the Pedestrian's Intention to Cross the Street," Conference Record—IEEE Conference on Intelligent Transportation Systems, Sep. 2012 , 6 pp.

U.S. Appl. No. 16/692,761, filed Nov. 22, 2019, by Wallin et al.

Moon et al., "V2V-PoseNet: Voxel-to-Voxel Prediction Network for Accurate 3D Hand and Human Pose Estimation from a Single Depth Map," 2018 IEEE/CVF Conference on Computer Vision and Pattern Recognition, Jun. 2018, pp. 5079-5088.

Sarafianos et al., "3D Human Pose Estimation: A Review of the Literature and Analysis of Covariates," Computer Vision and Image Understanding, vol. 152, Nov. 2016, pp. 1-20.

Ge et al., "3D Convolutional Neural Networks for Efficient and Robust Hand Pose Estimation from Single Depth Images," 2017 IEEE Conference on Computer Vision and Pattern Recognition, Jul. 21-26, 2017, pp. 5679-5688.

Maturana et al., "VoxNet: A 3D Convolutional Neural Network for Real-Time Object Recognition," 2015 IEEE/RSJ International Conference on Intelligent Robots and Systems (IROS), Sep. 28-Oct. 2, 2015, pp. 922-928.

Wu et al., "3D ShapeNets: A Deep Representation for Volumetric Shapes," 2015 IEEE Conference on Computer Vision and Pattern Recognition (CVPR), Jun. 7-12, 2015, pp. 1912-1920.

International Search Report and Written Opinion of International Application No. PCT/US2019/062858, dated Feb. 27, 2020, 14 pp.

Response to the Written Opinion of International Application No. PCT/US2019/062858 filed Sep. 3, 2020, 15 pp.

Written Opinion of International Application No. PCT/US2019/062858, dated Sep. 24, 2020, 6 pp.

Non-final Office Action issued in U.S. Appl. No. 16/692,761 dated Oct. 26, 2020, 10 pp.

Extended European Search Report issued in European Application No. 20162165.3 dated Aug. 4, 2020, 7 pp.

Response to Extended Search Report filed in European Application No. 20162165.3 dated Mar. 2, 2021, 19 pp.

Notice of Allowance from U.S. Appl. No. 16/692,761, dated Mar. 8, 2021, 5 pp.

Response to Office Action from U.S. Appl. No. 16/692,761, filed Jan. 21, 2021, 9 pp.

International Preliminary Report on Patentability from International Application No. PCT/US2019/062858 dated Feb. 26, 2021, 19 pp.

* cited by examiner

TOOL AND METHOD FOR ANNOTATING A HUMAN POSE IN 3D POINT CLOUD DATA

RELATED APPLICATIONS

This application claims the benefit of U.S. Provisional Application No. 62/817,400, filed Mar. 12, 2019, the entire content of which is incorporated by reference herein.

TECHNICAL FIELD

This application relates to pose estimation and pose annotation in computer vision-based techniques for figure detection.

BACKGROUND

Pose estimation is a computer vision technique where a human figure is detected from image or video data. In addition to detecting the presence of a human figure, computer vision techniques may further determine the position and orientation of the limbs of the human figure (i.e., the pose). Pose estimation can be useful in many fields, including autonomous driving. For example, the pose of a person may be used to determine the attention and intention of a human (e.g., a pedestrian, traffic police officer, etc.). Autonomous driving applications for an automobile may use the predicted or inferred intention and attention of a person from the estimated pose to determine driving behaviors.

SUMMARY

In the examples described below, this application describes techniques and devices for estimating the pose of one or more persons from a point cloud produced by a LiDAR (Light Detection and Ranging) sensor or other similar sensor. In some examples, the estimated pose for the one or more persons may be used to make driving decisions for an autonomous vehicle. However, the techniques of this disclosure are not limited to autonomous driving applications and may be used to estimate the pose of persons for any number of applications where pose estimation may be useful. By using the output of a LiDAR sensor, e.g., as opposed to a camera sensor, pose estimation may be performed quickly in difficult environments, including low-light environments.

A computing system may be configured to receive point cloud data from a LiDAR sensor or other similar sensor. The computing system may be further configured to convert the point cloud data into a structured data format, such as a frame of voxels (volume pixels). The computing system may then process the voxelized frame using a deep neural network. The deep neural network may be configured with a model that determines whether or not a person is present. The deep neural network also may perform a regression to estimate a pose for each of the one or more persons that are detected. In some examples, the computing system makes the determination of a person and the pose estimation serially. That is, in some examples, first the computing system detects a person with the deep neural network and then the computing system estimates the pose of the person using the deep neural network. In other examples, the computing system performs the determination of a person and the pose estimation in parallel. That is, in some examples, the computing system determines the presence of a person and the person's corresponding pose for each voxel at the same time. If the deep neural network determines that a person is not present in the voxel, the computing system discards the estimated pose.

The deep neural network may be configured to process the voxelized frame using one or more three-dimensional (3D) convolutional layers followed by one or more two-dimensional convolutional layers. 3D convolutional layers generally provide for a more accurate determination of a person and pose estimation, while 2D convolutional layers generally provide for a quicker determination of a person and pose estimation. By using a combination of 3D and 2D convolutional layers in the deep neural network, person detection and pose estimation may be performed with a desirable level of accuracy while also maintaining the speed useful for autonomous driving applications.

In another example, this disclosure describes techniques for annotating point cloud data. In order to train a deep neural network to estimate a pose of a person in point cloud data, the deep neural network may be configured and modified through processing of a training set of point cloud data. The training set of point cloud data is previously-labeled with the exact location and poses of persons within the point cloud (e.g., through manual labeling). This previous labeling of poses in the point cloud data may be referred to as annotation. Techniques for annotating human pose in two-dimensional images exist. However, annotating point cloud data is considerably different. For one, point cloud data is three-dimensional. Furthermore, point cloud data is sparse in relation to two-dimensional image data.

This disclosure describes a method, apparatus, and software for annotating point cloud data. A user may use the techniques of this disclosure to annotate point clouds to label one or more poses found in the point cloud data. The annotated point cloud data may then be used to train a neural network to more accurately identify and label poses in point cloud data in real-time.

In one example, this disclosure describes a method comprising causing display of point cloud data, labeling points in the point cloud data with a plurality of annotation points, the plurality of annotation points corresponding to points on a human body, moving, in response to a user input, one or more of the annotation points to define a human pose and create annotated point cloud data, and outputting the annotated point cloud data.

In another example, this disclosure describes an apparatus comprising a memory configured to store point cloud data, and one or more processors in communication with the memory, the one or more processors configured to cause display of the point cloud data, label points in the point cloud data with a plurality of annotation points, the plurality of annotation points corresponding to points on a human body, move, in response to a user input, one or more of the annotation points to define a human pose and create annotated point cloud data, and output the annotated point cloud data.

In another example, this disclosure describes an apparatus comprising means for causing display of point cloud data, means for labeling points in the point cloud data with a plurality of annotation points, the plurality of annotation points corresponding to points on a human body, means for moving, in response to a user input, one or more of the annotation points to define a human pose and create annotated point cloud data, and means for outputting the annotated point cloud data.

In another example, this disclosure describes a non-transitory computer-readable storage medium storing instructions that, when executed, cause one or more processors to cause display of point cloud data, label points in the point cloud data with a plurality of annotation points, the plurality of annotation points corresponding to points on a human body, move, in response to a user input, one or more of the annotation points to define a human pose and create annotated point cloud data, and output the annotated point cloud data.

The details of one or more embodiments of the invention are set forth in the accompanying drawings and the description below. Other features, objects, and advantages of the invention will be apparent from the description and drawings, and from the claims.

DETAILED DESCRIPTION

Pose estimation is a computer vision technique where a human figure is detected from an image or video. In addition to detecting the presence of a human figure, computer vision techniques may further determine the position and orientation of the limbs of the human figure (i.e., the pose). Pose estimation can be useful in many fields, including autonomous driving. For example, the pose of a person may be used to determine the attention and intention of a human (e.g., a pedestrian, traffic cop, etc.) or the needs of a human (e.g., a pedestrian raising an arm to hail a taxi). Autonomous driving applications of an automobile may use the predicted intention and attention of a person from the estimated pose to determine driving behaviors.

In some examples, pose estimation is performed on image data received from a camera sensor. Such data has several drawbacks. For example, if the output from the camera sensor does not include depth information, it may be difficult to discern the relative locations of persons in the image. Even if the output from the camera sensor does include depth information, performing pose estimation may be difficult or impossible in dark environments.

This disclosure describes techniques for performing pose estimation using point cloud data, such as point cloud data produced by a LiDAR sensor. The point cloud output from a LiDAR sensor provides a 3D map of objects in the vicinity of the sensor. As such, depth information is available. In addition, as opposed to a camera sensor, a LiDAR sensor may generate the point clouds in a dark environment. The techniques of this disclosure include processing the point cloud from a LiDAR sensor using a deep neural network to detect the presence of persons near the sensor and to estimate the pose of such persons in order to make autonomous driving decisions.

Figure 1:
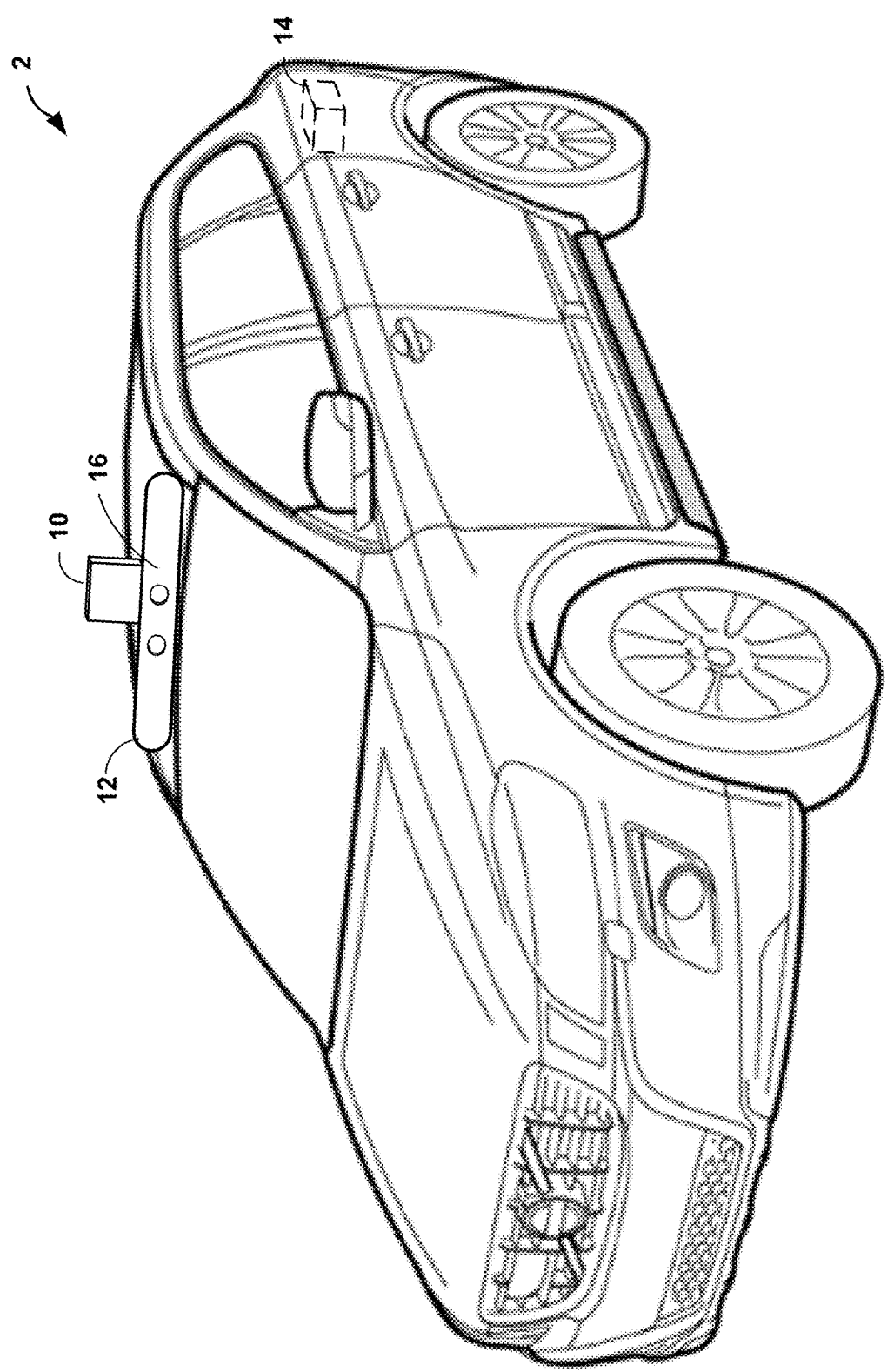
FIG. 1 is a conceptual diagram illustrating an example operating environment of the techniques of this disclosure.

FIG. 1 is a conceptual diagram illustrating an example operating environment of the techniques of this disclosure. In one example of the disclosure, automobile 2 may include components configured to perform pose estimation. In this example, automobile 2 may include a LiDAR sensor 10, a computing system 14, and optionally, a camera(s) 16.

The techniques of this disclosure are described with reference to automotive applications, including autonomous driving applications. However, it should be understood that the techniques of this disclosure for person detection and pose estimation may be used for other contexts.

Automobile 2 may be any type of passenger vehicle. LiDAR sensor 10 may be mounted to automobile 2 using bracket 12. In other examples, LiDAR sensor 10 may be mounted to automobile 2 in other configurations, or integrated in or carried by structure of the automobile, such as bumpers, sides, windshields, or the like. Additionally, automobile 2 may be configured to use a plurality of LiDAR sensors. As will be explained in more detail below, computing system 14 may be configured to receive point cloud data from LiDAR sensor 10 and determine the location and poses of persons in the field of view of LiDAR sensor 10.

LiDAR sensor 10 includes a laser that is configured to emit laser pulses. LiDAR sensor 10 further includes a receiver to receive laser light reflected off objects near LiDAR sensor 10. LiDAR sensor 10 measures distance to an object by illuminating the object with pulsed laser light and measuring the reflected pulses. Differences in return times and wavelengths of the reflected pulses are used to determine a 3-D representation of one or more objects (e.g., people).

LiDAR sensor 10 may further include a global positioning sensor (GPS) or similar sensors to determine the exact physical location of the sensor and objects sensed from the reflected laser light. LiDAR sensor 10 may be further configured to detect additional information, like intensity. The intensity of a point in the point cloud may indicate the reflectivity of the object detected by LiDAR sensor 10. Typically, the 3-D representation captured by LiDAR sensor 10 is stored in the form of a point cloud. Point clouds are a collection of points that represent a 3D shape or feature. Each point has its own set of X, Y and Z coordinates and in some cases additional attributes (e.g., GPS location and intensity). The resulting point clouds of the LiDAR collection method may be saved and/or transmitted to computing system 14.

While LiDAR sensors are described in this disclosure, the techniques for pose estimation described herein may be used with the output of any sensor that works in low light and/or outputs point cloud data. Additional sensor types that may be used with the techniques of this disclosure may include, for example, radar, ultrasonic, camera/imaging sensors, and/or sonar sensors.

Computing system 14 may be connected to LiDAR sensor through wired or wireless communication techniques. Computing system may include one or more processors that are configured to receive the point cloud from LiDAR sensor 10. As will be explained in more detail below, computing system 14 may be configured to perform pose estimation. For example, computing system 14 may be configured to receive the point cloud from LiDAR sensor 10, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons. The techniques of this disclosure are not limited to the detection and pose estimation for persons (e.g., pedestrians, cyclists, etc.), but may also be used for pose detection of animals (e.g., dogs, cats, etc.).

Bracket 12 may include one or more cameras 16. The use of a bracket is just one example. The cameras 16 may be positioned in any suitable place on automobile 2. Automobile 2 may further include additional cameras not shown in FIG. 1. Computing system 14 may be connected to cameras 16 to receive image data. In one example of the disclosure, computing system 14 may be further configured to perform pose estimation using camera-based techniques. In such examples, computing system 14 may be configured to estimate the poses of one or more persons using both camera-based techniques and the LiDAR-based techniques described in this disclosure. Computing system 14 may be configured to assign weights to each of the poses determined by the camera-based and LiDAR based techniques and determine a final pose of a person based on a weighted average of the determined poses. Computing system 14 may be configured to determine the weights based on a confidence level for each of the techniques. For example, LiDAR-based techniques may have a higher confidence of being accurate, compared to camera-based techniques, in low-light environments.

Figure 2:
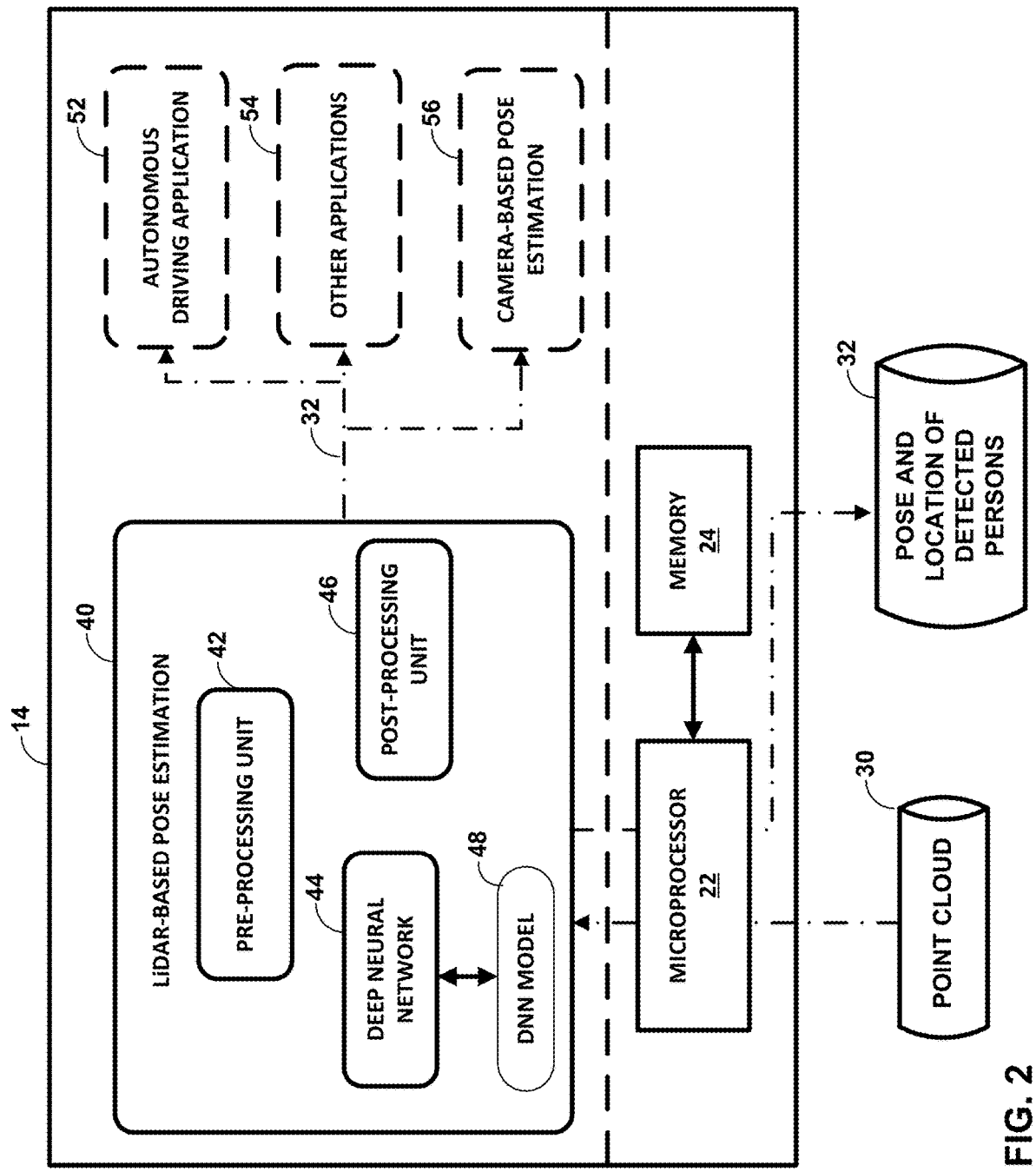
FIG. 2 is a block diagram illustrating an example apparatus configured to perform the techniques of this disclosure.

FIG. 2 is a block diagram illustrating an example apparatus configured to perform the techniques of this disclosure. In particular, FIG. 2 shows an example of computing system 14 of FIG. 1 in more detail. Again, in some examples, computing system 14 may be part of automobile 2. However, in other examples, computing system 14 may be a stand-alone system or may be integrated into other devices for use in other applications which may benefit from pose estimation.

Computing system 14 includes microprocessor 22 in communication with memory 24. In some examples, computing system 14 may include multiple microprocessors. Microprocessor 22 may be implemented as fixed-function processing circuits, programmable processing circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

In the example of FIG. 2, microprocessor 22 may be configured to execute one or more sets of instructions in LiDAR-based pose estimation module 40 to perform pose estimation in accordance with the techniques of this disclosure. The instructions that define LiDAR-based pose estimation module 40 may be stored in memory 24. In some examples, the instructions that define LiDAR-based pose estimation module 40 may be downloaded to the memory 24 over a wired or wireless network.

In some examples, memory 24 may be a temporary memory, meaning that a primary purpose of memory 24 is not long-term storage. Memory 24 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 24 may include one or more non-transitory computer-readable storage mediums. Memory 24 may be configured to store larger amounts of information than typically stored by volatile memory. Memory 24 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 24 may store program instructions (e.g., LiDAR-based pose estimation module 40) and/or information (e.g., point cloud 30 and pose and location of detected persons 32) that, when executed, cause microprocessor 22 to perform the techniques of this disclosure.

The following techniques of the disclosure will be described with reference to microprocessor 22 executing various software modules. However, it should be understood that each of the software modules described herein may also be implemented in dedicated hardware, firmware, software, or any combination of hardware, software, and firmware.

LiDAR-based pose estimation module 40 may include a pre-processing unit 42, a deep neural network (DNN) 44, and a post-processing unit 46. LiDAR-based pose estimation module 40 is configured to receive point cloud 30 from a LiDAR sensor (e.g., LiDAR sensor 10 of FIG. 1). Pre-processing unit 42 is configured to make the unstructured raw input (i.e., point cloud 30) into structuralized frame (e.g., matrix data), so deep neural network 44 can process the input data.

Pre-processing unit 42 may be configured to process point cloud 30 into a structuralized frame in many ways. In one example, pre-processing 42 may be configured to convert the point cloud into voxels (volume pixels). Pre-processing unit 42 may be configured to perform such voxelization according to a pre-defined data structure for the voxels. For example, each of the voxels may be defined by a size of a three-dimensional (3D) bin (e.g., in terms of X, Y, and Z coordinates), as well as the type of data stored for a 3D bin. For example, each 3D bin (i.e., voxel) may include data indicating the number of points from point cloud 30 located in the bin, the location of the points from point cloud 30 in the bin, as well as the intensity of such points. Other examples of data that may be stored in the voxels include mean and variance of height, width, length (x, y, z coordinates), mean and variance of intensity/reflectivity, and other statistics of the point cloud within or even neighboring the voxel. In some examples, a voxel may include zero points from point cloud 30, one point from point cloud 30, or multiple points from point cloud 30. Using pre-defined bins may be referred to as manual voxelization. In other examples, pre-processing unit 42 may be configured to voxelize point cloud 30 in an adaptive manner, e.g., by using a neural network that takes raw point cloud 30 as input and outputs a structured (voxelized) frame.

Deep neural network 44 receives the voxelized frame from pre-processing unit 42. A deep neural network is a type of machine learning algorithm. Deep neural network 44 may be configured with multiple layers of processing layers, each layer configured for determining and/or extracting features from the input data (in this case the voxelized frame of point cloud 30). Each successive layer of deep neural network 44 may be configured to use the output from the previous layer as input.

In some examples, deep neural network 44 may configured as a convolutional deep neural network. A convolutional deep neural network is a type of deep, feed-forward neural network. Each layer of a convolutional deep neural network may be referred to as a convolutional layer. Convolutional layers apply a convolution operation to the input (e.g., a voxel of the voxelized frame), passing the result to the next layer. Deep neural network 44 may be configured with both 3D and 2D convolutional layers. The 3D convolutional layers provide for a more accurate feature extraction (e.g., more accurate identification of persons and corresponding poses), while the 2D convolutional layers provide for a faster feature extraction, as compared to the 3D convolutional layers. Deep neural network 44 may be configured to first process the voxelized frame with one or more 3D convolutional layers, and then continue to process the voxelized frame with one or more 2D convolutional layers. The 2D convolutional layers may be configured to only process data from the voxelized frame in the X and Y direction (i.e., not in the Z direction). The number of 3D and 2D convolutional layers, and the division point between the layers determines the tradeoff between speed and accuracy of the pose estimation. By using a combination of 3D and 2D convolutional layers in deep neural network 44, person detection and pose estimation may be performed with a desirable level of accuracy while also maintaining the speed useful for autonomous driving applications.

Deep neural network 44 is configured to analyze the voxelized frame and produce two outputs for each of the voxels. One output may be called a classification. The classification indicates whether or not a person is present in the voxel being analyzed. The other output may be called a pose estimation that is produced from a regression. The regression determines the pose of the person (or a key point of a person) if such a person is present in the voxel. As will be explained in more detail below, deep neural network 44 may be configured to perform the classification and regression techniques in serial or in parallel.

Deep neural network 44 may be configured to process each voxel through DNN model 48. DNN model 48 defines the number of 3D and 2D convolutional layers as well as the function performed for each layer. DNN model 48 may be trained with a large number of data-label pairs. In the data label-pair, the data is the voxelized point cloud data, while the label is a possible 3D pose. DNN model 48 is trained by manually annotating (e.g., labeling) point cloud data, and then training deep neural network 44 with the labeled data. The output of deep neural network 44 is compared to the expected output given the labeled data. Technicians may then adjust DNN model 48 to find an optimal set of weights for the layers of deep neural network 44 so that given a pre-annotated point cloud, the desired label is predicted when processed by deep neural network 44. DNN model 38 may be predefined and may be periodically updated.

Deep neural network 44 may be configured to produce a classification and regression results for each anchor position. In one example, deep neural network may be configured to consider the center of a voxel as an anchor position. For each anchor position, deep neural network 44 may be configured to compare the data stored in the voxel to one or more predefined anchor skeletons (also called a standard or canonical skeleton). The anchor skeleton may be defined by a plurality of key points. In one example, anchor skeletons are defined by fourteen joints and/or key points: head, neck, left shoulder, right shoulder, left elbow, right elbow, left hand, right hand, left waist, right waist, left knee, right knee, left foot, and right foot. In general, a key point may correspond to a feature or structure of the human anatomy (e.g., a point on the human body).

During processing by deep neural network 44, an anchor skeleton is activated (i.e., classified as positive for the presence of a person) if the overlapping area between a bounding box of the anchor skeleton and that of any ground truth skeleton (i.e., the data present in the voxel) satisfies a threshold condition. For example, if the overlapping area of the bounding box of the anchor skeleton and the voxel is above a certain threshold (e.g., 0.5), the anchor skeleton is activated for that voxel and the presence of a person is detected. The threshold may be a measurement of the amount of overlap (e.g., the intersection-over-union (IOU). Deep neural network 44 may make the classification based on comparison to one or more multiple different anchor skeletons. Deep neural network 44 may also be performed to perform a regression that encodes the difference between an anchor skeleton and the ground truth skeleton (i.e., the data in the actual voxel). Deep neural network 44 may be configured to encode this difference for each of a plurality of key points defined for the anchor skeleton. The difference between the key points of the anchor skeleton and the data in the voxel is indicative of the actual pose of the person detected during classification. Deep neural network may then be configured to provide the classification (e.g., a location of the determined one or more persons) and the pose for each of the determined one or more persons to post-processing unit 46. When multiple persons are detected from the point cloud, multiple anchor skeletons will be activated, thus achieving multi-person pose estimation.

Post-processing unit 46 may be configured to turn the output of deep neural network 44 into final output. For example, post-processing unit 46 may be configured to perform non-maximum suppression on the classified and estimated poses produced by deep neural network 44 and produce a final location and pose of the persons detected. Non-maximum suppression is an edge thinning technique. In some cases, deep neural network 44 will classify persons and estimate poses for many closely spaced groups of voxels where only one person actually exists. That is, in some circumstances, deep neural network will detect overlapping duplicates of the same person. Post-processing unit 46 may use non-maximum suppression techniques to remove duplicate skeletons. Post-processing unit 46 outputs the pose and location of the detected persons data 32. Pose and location of the detected persons data 32 may include the location of a person detected by LiDAR-based pose estimation module 40 (e.g., in terms of GPS coordinates) as well as a pose of a skeleton defining the person (e.g., the location of the key points). The pose and location of the detected persons data 32 may be stored in memory 24, sent to autonomous driving application 52, other applications 54, camera-based pose estimation application 56, or transmitted from computing system 14 to another computing system.

In one example, autonomous driving application 52 may be configured to receive pose and location of detected persons data 32 and predict or determine the intention and/or attention, or other behavioral cues of the identified persons to make autonomous driving decisions.

In other examples, camera-based pose estimation application 56 may receive pose and location of detected persons data 32. Camera-based pose estimation application 56 may be configured to determine a pose of one or more persons using image data produced by cameras 16 (FIG. 1). Camera-based pose estimation application 56 may be further configured to assign weights to each of the poses determined by the camera-based and LiDAR based techniques and determine a final pose of a person based on a weighted average of the determined poses. Camera-based pose estimation application 56 may be configured to determine the weights based on a confidence level for each of the techniques. For example, LiDAR-based techniques may have a higher confidence of being accurate, compared to camera-based techniques, in low-light environments.

Other applications 54 represent various other contexts in which pose and location of detected persons data 32 may be used in other contexts. For example, the poses and locations output by LiDAR-based pose estimation module 40 may be used in various applications for body language recognition, motion understanding (e.g., traffic, police officers, emergency services personnel, or other personnel signaling/directing traffic), attention and intention detection (e.g., pedestrians waiting/crossing streets), movies, animation, gaming, robotics, human-computer interaction, machine learning, virtual reality, alternative reality, surveillance, abnormal behavior detection, and public security.

Figure 3:
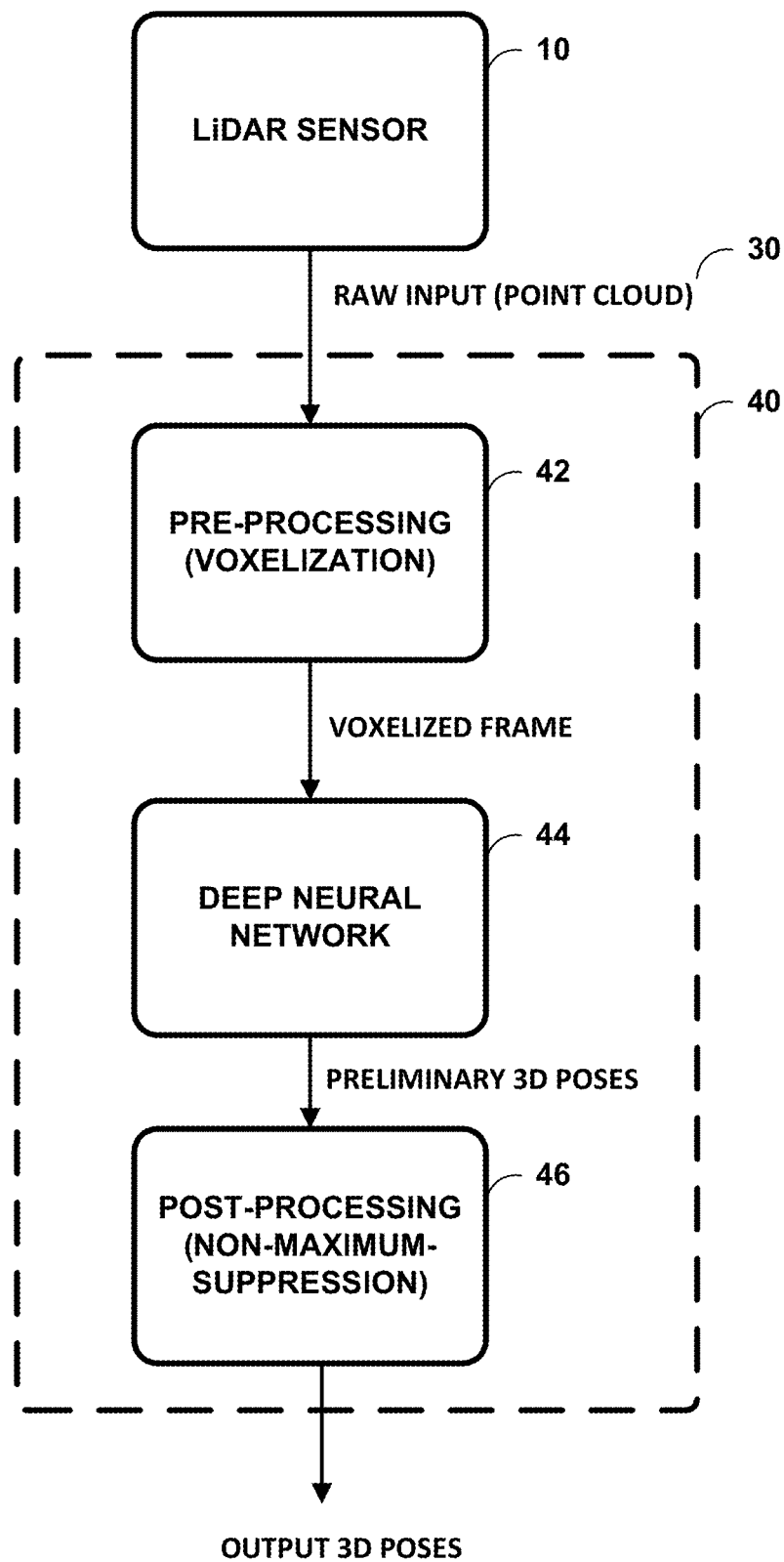
FIG. 3 is a block diagram illustrating a process flow of one example of the disclosure.

FIG. 3 is a block diagram illustrating a process flow of one example of the disclosure. As shown in FIG. 3, LiDAR sensor 10 may be configured to capture a point cloud 30 that is the raw input to LiDAR-based pose estimation module 40. LiDAR-based pose estimation module 4 processes point cloud 30 with pre-processing unit 42 (voxelization) to produce a voxelized frame. Deep neural network 44 then processes the voxelized frame to produce classifications of one or more persons (e.g., the location of one or more persons) as well as the pose or poses for the classified one or more persons. The pose for a person is defined by the locations of a plurality of key points of a skeleton. The output of deep neural network 44 are preliminary 3D poses. Post-processing unit 46 processes the preliminary 3D poses with a non-maximum suppression algorithm to produce the output 3D poses.

Figure 4:
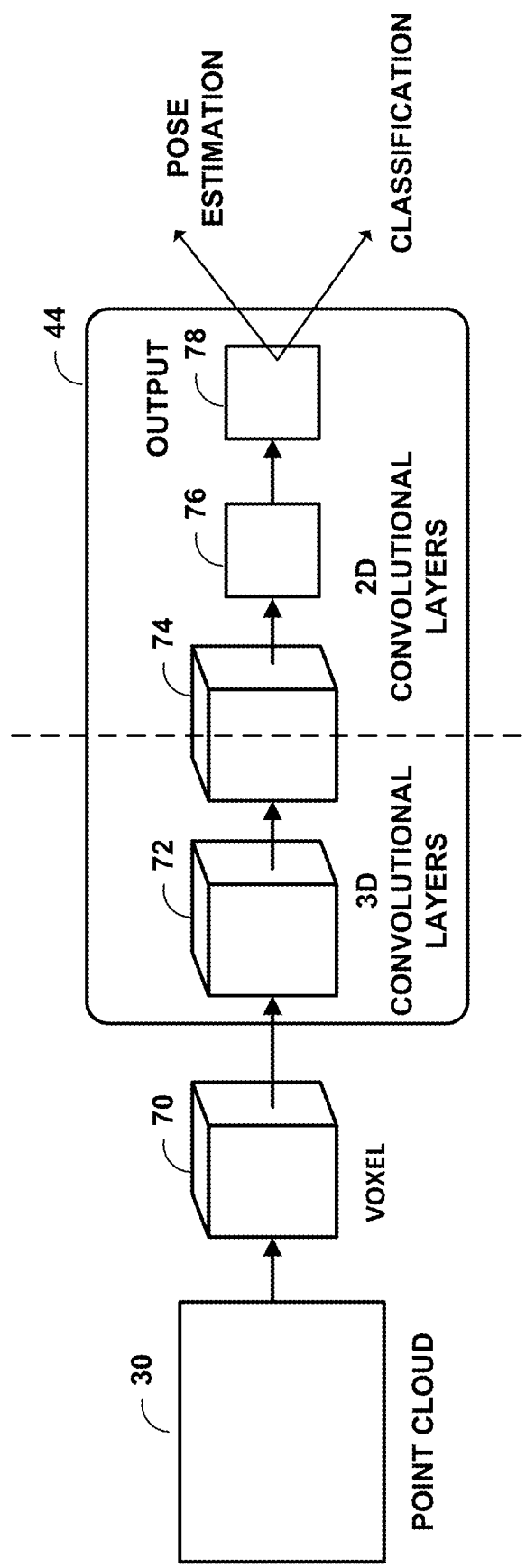
FIG. 4 is a conceptual diagram illustrating a parallel process flow using a deep neural network according to one example of the disclosure.

FIG. 4 is a conceptual diagram illustrating a parallel process flow using a deep neural network according to one example of the disclosure. As shown in FIG. 4, point cloud 30 is first converted to voxelized frame that includes a plurality of voxels. In this example, deep neural network 44 processes each voxel 70 of the voxelized frame. Deep neural network 44 processes voxel 70 using one or more 3D convolutional layers 72. 3D convolutional layer 74 represents the last layer that operates on 3D voxel data. After 3D convolutional layer 74, deep neural network 44 processes voxel 70 with one or more 2D convolutional layers 76. The 2D convolutional layers 76 operate on only two dimensions of voxel data (e.g., XY data). 2D convolutional layer 78 represents the last 2D convolutional layer which outputs both a classification and a pose estimation. In the example of FIG. 4, the layers of deep neural network 44 are configured to classify and estimate poses for each of the voxels in parallel. That is, layers of deep neural network 44 may be configured to classify and estimate poses for more than one voxel at the same time. If deep neural network 44 determines that the voxel is not to be classified as a person, any estimated pose may be discarded.

Figure 5:
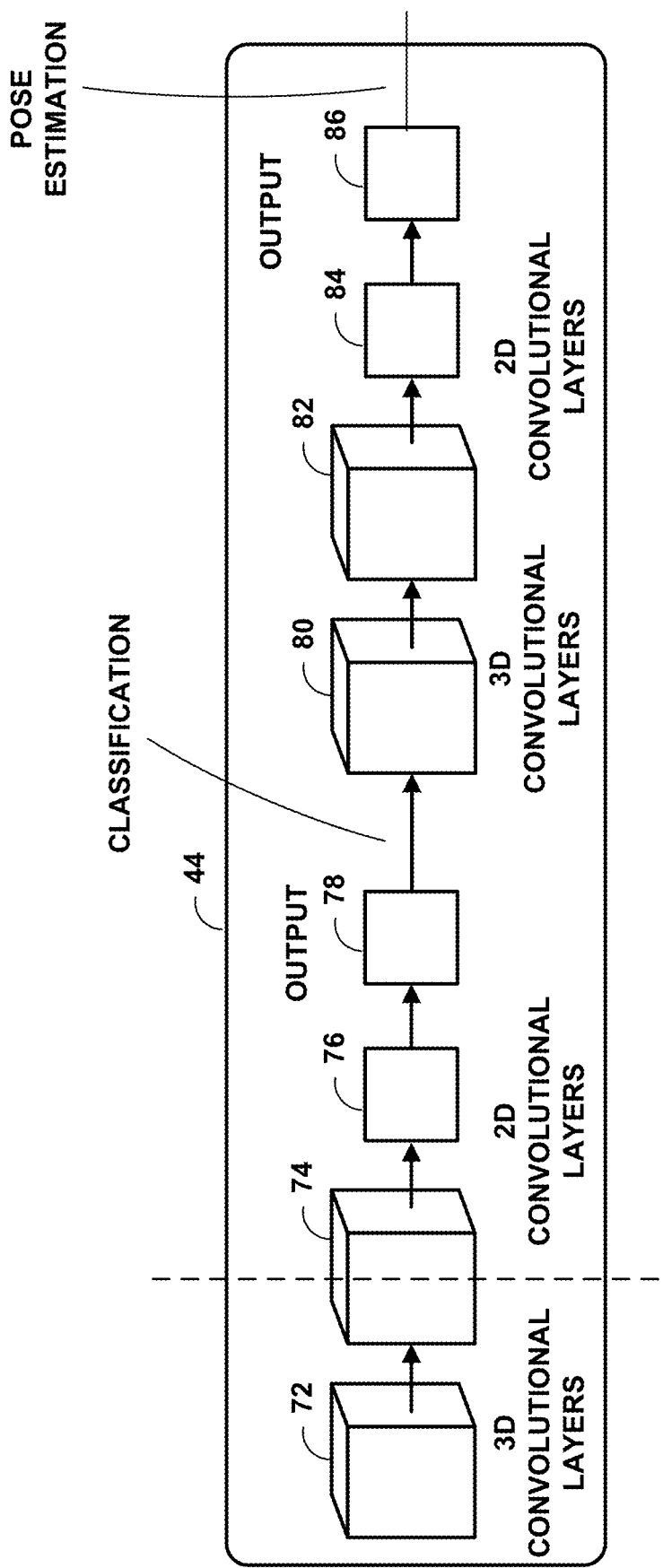
FIG. 5 is a conceptual diagram illustrating a sequential process flow using a deep neural network according to one example of the disclosure.

FIG. 5 is a conceptual diagram illustrating a sequential process flow using a deep neural network according to one example of the disclosure. In the example of FIG. 5, 3D convolutional layers 72 and 74, and 2D convolutional layers 76 and 78 are configured to classify an input voxel as being a person or not. If 2D convolutional layer 78 does not classify a person, the process is ended. If 2D convolutional layer 78 does classify a person, deep neural network 44 will then process the input voxel using 3D convolutional layers 80 and 82 and 2D convolutional layers 84 and 86 to estimate a pose of the classified person. That is, deep neural network 44 may be configured to use separate neural networks for classification and pose estimation. In this example, the classification and pose estimation processes are performed sequentially.

Figure 6:
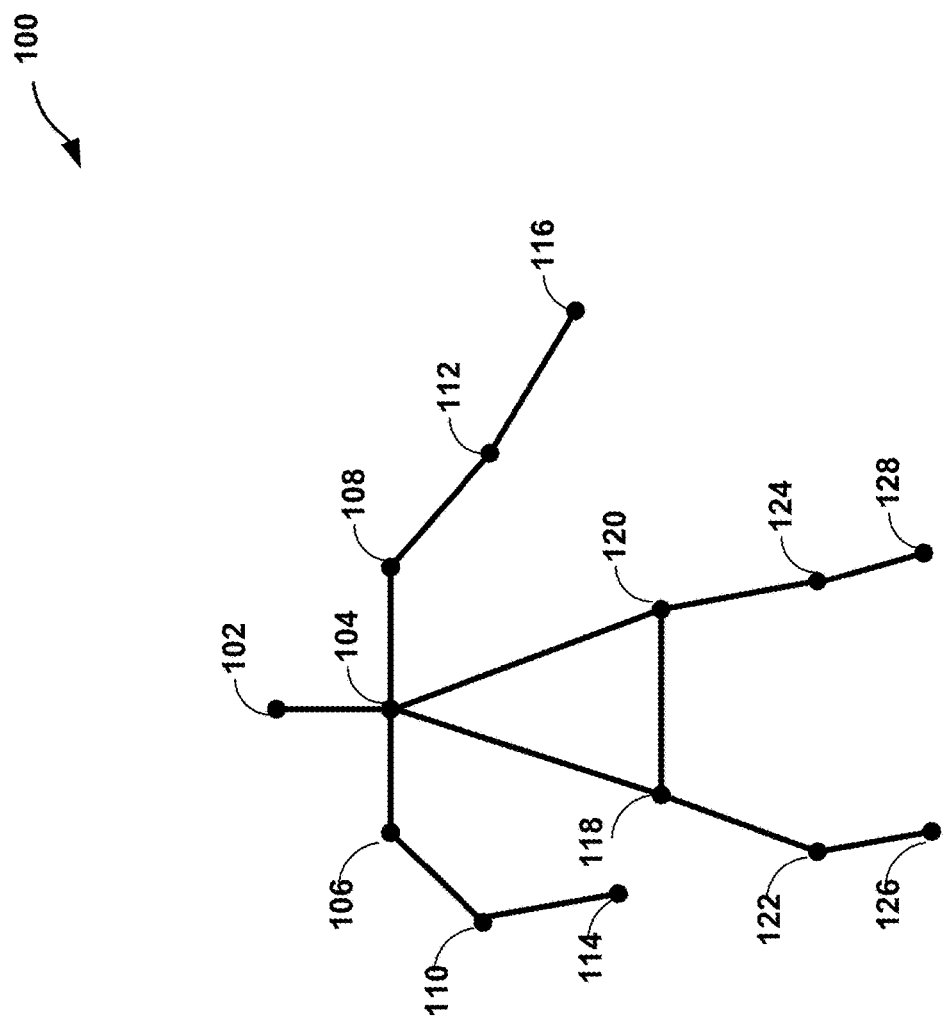
FIG. 6 is a conceptual diagram showing an example anchor skeleton.

FIG. 6 is a conceptual diagram showing an example skeleton. Skeleton 100 may represent either a predefined anchor skeleton or the pose of a ground truth skeleton estimated using the techniques of the disclosure described above. In one example of the disclosure, skeleton 100 may be defined by a plurality of key points and/or joints. In the example of FIG. 6, skeleton 100 comprises 14 key points. As shown in FIG. 6, skeleton 100 is defined by head key point 102, neck key point 104, left shoulder key point 108, right shoulder key point 106, left elbow 112, right elbow key point 110, left hand key point 116, right hand key point 114, left waist key point 120, right waist key point 118, left knee key point 124, right knee key point 122, left foot key point 128, and right foot key point 126. To determine a pose, microprocessor 22 (see FIG. 2) may be configured to determine a location (e.g., a location in 3D space) of each of the key points of skeleton 100. That is, the locations of each of the key points of skeleton 100 relative to each other define the pose of the skeleton, and thus the pose of the person detected from the point cloud.

For other applications, more or fewer key points may be used. The more key points that are used to define skeleton 100, the greater number of unique poses that may be estimated. However, more key points may also result in a longer processing time to estimate the pose.

Figure 7:
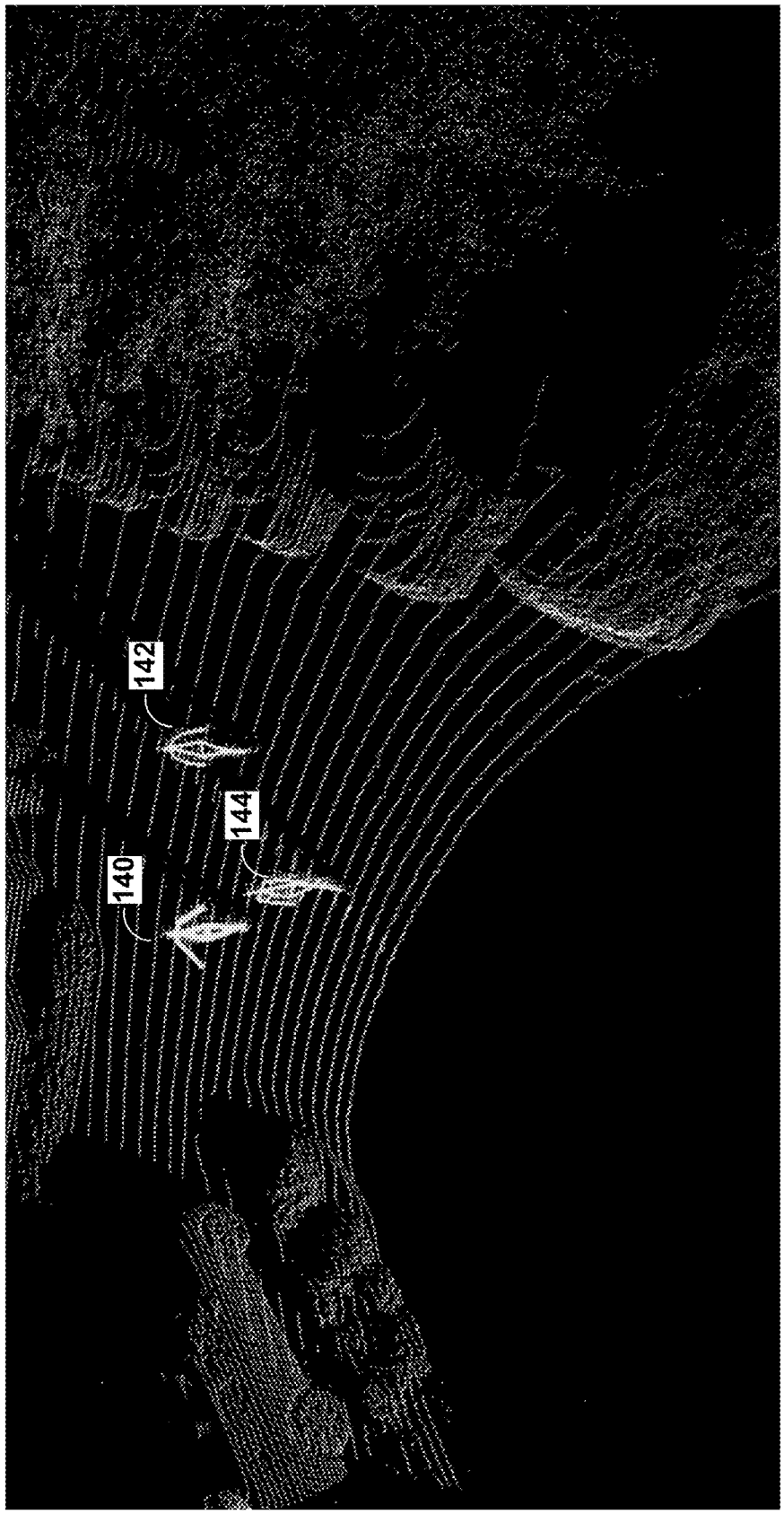
FIG. 7 is a conceptual diagram showing an example point cloud with multiple classified skeletons with estimated poses.

FIG. 7 is a conceptual diagram showing an example point cloud 30 with multiple classified skeletons with estimated poses. As shown in FIG. 7, point cloud 30 is shown with a visualization of three detected skeletons 140, 142, and 144. The skeletons are shown with different poses that may be seen by the different locations of the 14 key points from FIG. 6. Note that skeleton 140 shows one example of skeleton that has not been processed by a non-maximum suppression algorithm. Rather than showing a single skeleton, skeleton 140 is actually multiple overlapping skeletons. In some examples of the disclosure, rather than just outputting data indicating the location and poses of detected persons, computing system 14 may be further configured to produce a visualization of the detected skeletons, such as the visualization shown in FIG. 7.

Figure 8:
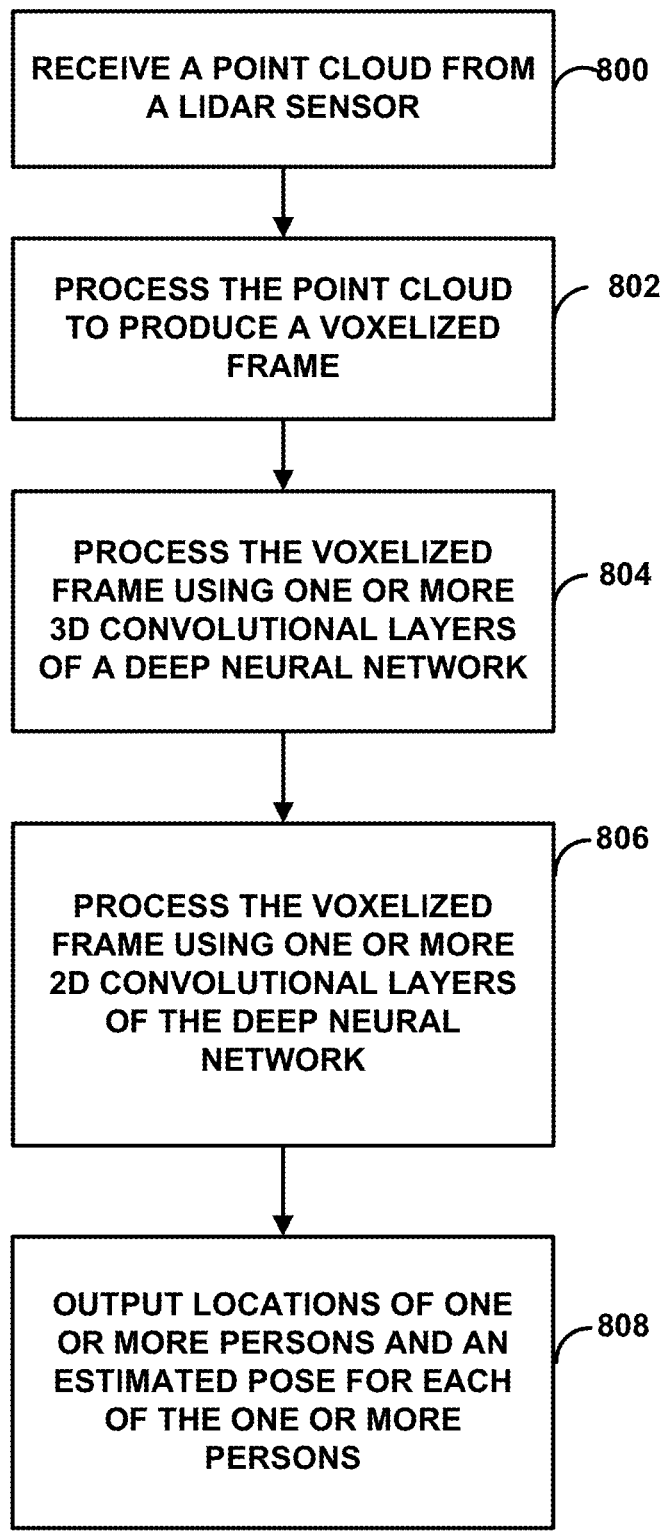
FIG. 8 is a flowchart illustrating an example operation of an apparatus configured to perform pose estimation in accordance with one example of the disclosure.

FIG. 8 is a flowchart illustrating an example operation of an apparatus configured to perform pose estimation in accordance with one example of the disclosure. One or more processors may be configured to perform the techniques shown in FIG. 8, including microprocessor 22 of computing system 14. As described above, in some examples, computing system 14 may be part of automobile 2. In this example, automobile 2 may be configured to use the pose estimation produced by computing system 14 to make autonomous driving decisions. However, the techniques of this disclosure are not so limited. Any processor or processing circuitry may be configured to perform the techniques of FIG. 8 for pose estimation for any number of applications, including AR/VR, gaming, HCl, surveillance and monitoring, and the like.

In one example of the disclosure, computing system 14 may include memory 24 configured to receive a point cloud 30 (see FIG. 2) from LiDAR sensor 10 (see FIG. 1). Computing system 14 may further include one or more processors implemented in circuitry (e.g., microprocessor 22 of FIG. 2), the one or more processors being in communication with the memory. Microprocessor 22 may be configured to receive the point cloud from LiDAR sensor 10 (800). The point cloud includes a plurality of points representing positions of objects relative to LiDAR sensor 10. Microprocessor 22 may be further configured to process the point cloud to produce a voxelized frame including a plurality of voxels (802). In one example of the disclosure, each voxel of the voxelized frame includes a data structure that indicates the presence or absence of points from the point cloud in the voxel.

Microprocessor 22 may be further configured to process the voxelized frame using one or more 3D convolutional layers of a deep neural network (804), and to process the voxelized frame using one or more 2D convolutional layers of the deep neural network (806). Microprocessor 22 processes the voxelized frame using the 3D and 2D convolutional layers to determine one or more persons relative to the LiDAR sensor and a pose for each of the one or more persons. Microprocessor 22 may then output a location of the determined one or more persons and the pose for each of the determined one or more persons (808).

In one example, microprocessor 22 may be configured to determine, for a first voxel of the voxelized frame, if a person is present, and activate an anchor skeleton for the first voxel based on the determination, wherein the data represented in the first voxel is defined as a ground truth skeleton. Microprocessor 22 may be configured to determine the presence of persons and a pose of such persons either sequentially or in parallel. In one example, microprocessor 22 may be configured to determine, in parallel with determining if the person is present, a difference between the ground truth skeleton and the anchor skeleton, estimate a pose of the ground truth skeleton based on the difference, and output the pose in the case that the anchor skeleton is activated. In another example, microprocessor 22 may be configured to determine a difference between the ground truth skeleton and the anchor skeleton in the case that the anchor skeleton is activated, estimate a pose of the ground truth skeleton based on the difference, and output the pose.

The anchor skeleton is defined by a plurality of key points. To determine the difference between the ground truth skeleton and the anchor skeleton, microprocessor 22 may be configured to determine the difference between the ground truth skeleton and each of the key points of the anchor skeleton.

In another example of the disclosure, microprocessor 22 may be further configured to process the determined one or more persons relative to the LiDAR sensor and the pose for each of the one or more persons using a non-maximum-suppression technique to remove duplicates of the one or more persons.

In other examples of the disclosure, the pose estimation techniques of this disclosure may be extended over a series of frames to detect a sequence of poses that may make up a certain action (e.g., waving, walking, running, etc.). Such action recognition may use temporal information (e.g., LiDAR point cloud data from multiple time instances) to perform the action recognition. Accordingly, in one example, DNN 44 may be configured to process a plurality of voxelized frames determine at least one person relative to a LiDAR sensor and a sequence of poses for the at least one person. DNN 44 may then determine an action for the at least one person from the sequence of poses. Two examples ways of implementing action recognition are described below.

In a first example, DNN 44 may be configured to stack and/or concatenate a fixed number of outputs for each frame of point clouds 30 into a single data sample. DNN 44 may feed the single data sample into a classifier to classify the action category. At frame index t, DNN 44 may be configured to use a time window size of w to produce a single sample which is the combined w output from frame t−w+1 to t. DNN 44 may be configured to include a classifier that is a (multi-class) deep neural network or any type of machine learning model, such as a support-vector machine (SVM).

In another example, DNN 44 may be configured to use a per frame output in a sequential manner. For example, DNN 44 may be configured to feed the per frame output into a Recursive Neural Network, and determine a prediction of the action either at every frame or after a certain number of frames.

So, instead of or in addition to per frame pose estimation (e.g., the skeleton output), DNN 44 may be configured to either stitch outputs as a batch or feed the outputs sequentially to obtain a higher level of action recognition. Some of the possible categories for actions to recognize may include standing, walking, running, biking, skateboarding, waving, etc.

Additional examples and combinations of techniques of the disclosure are described below.

1. A method for pose estimation, the method comprising: receiving a point cloud from a LiDAR sensor, the point cloud including a plurality of points representing positions of objects relative to the LiDAR sensor; processing the point cloud to produce a voxelized frame including a plurality of voxels; processing the voxelized frame using a deep neural network to determine one or more persons relative to the LiDAR sensor and a pose for each of the one or more persons; and outputting a location of the determined one or more persons and the pose for each of the determined one or more persons.

2. The method of claim 1, wherein each voxel of the voxelized frame includes a data structure that indicates the presence or absence of points from the point cloud in the voxel.

3. The method of claim 1 or 2, wherein processing the voxelized frame using the deep neural network comprises: processing the voxelized frame using a convolutional deep neural network, wherein the convolutional deep neural network includes one or more three-dimensional convolutional layers followed by one or more two-dimensional convolutional layers.

4. The method of any combination of claim 1-3, wherein processing the voxelized frame using the deep neural network comprises: determining, for a first voxel of the voxelized frame, if a person is present; and activating an anchor skeleton for the first voxel based on the determination, wherein the data represented in the first voxel is defined as a ground truth skeleton.

5. The method of any combination of claims 1-4, further comprising: determining, in parallel with determining if the person is present, a difference between the ground truth skeleton and the anchor skeleton; estimating a pose of the ground truth skeleton based on the difference; and outputting the pose in the case that the anchor skeleton is activated.

6. The method of any combination of claims 1-4, further comprising: determining a difference between the ground truth skeleton and the anchor skeleton in the case that the anchor skeleton is activated; estimating a pose of the ground truth skeleton based on the difference; and outputting the pose.

7. The method of any combination of claims 1-6, wherein the anchor skeleton is defined by a plurality of key points.

8. The method of any combination of claims 1-7, wherein determining the difference between the ground truth skeleton and the anchor skeleton comprises: determining the difference between the ground truth skeleton and each of the key points of the anchor skeleton.

9. The method of any combination of claims 1-8, further comprising: processing the determined one or more persons relative to the LiDAR sensor and the pose for each of the one or more persons using a non-maximum-suppression technique to remove duplicates of the one or more persons.

10. An apparatus configured to perform pose estimation, the apparatus comprising: a memory configured to receive a point cloud from a LiDAR sensor; and one or more processors implemented in circuitry, the one or more processors in communication with the memory and configured to: receive the point cloud from the LiDAR sensor, the point cloud including a plurality of points representing positions of objects relative to the LiDAR sensor; process the point cloud to produce a voxelized frame including a plurality of voxels; process the voxelized frame using a deep neural network to determine one or more persons relative to the LiDAR sensor and a pose for each of the one or more persons; and output a location of the determined one or more persons and the pose for each of the determined one or more persons.

11. The apparatus of claim 10, wherein each voxel of the voxelized frame includes a data structure that indicates the presence or absence of points from the point cloud in the voxel.

12. The apparatus of any combination of claims 10-11, wherein to process the voxelized frame using the deep neural network, the one or more processors are further configured to: process the voxelized frame using a convolutional deep neural network, wherein the convolutional deep neural network includes one or more three-dimensional convolutional layers followed by one or more two-dimensional convolutional layers.

13. The apparatus of any combination of claims 10-12, wherein to process the voxelized frame using the deep neural network, the one or more processors are further configured to: determine, for a first voxel of the voxelized frame, if a person is present; and activate an anchor skeleton for the first voxel based on the determination, wherein the data represented in the first voxel is defined as a ground truth skeleton.

14. The apparatus of any combination of claims 10-13, wherein the one or more processors are further configured to: determine, in parallel with determining if the person is present, a difference between the ground truth skeleton and the anchor skeleton; estimate a pose of the ground truth skeleton based on the difference; and output the pose in the case that the anchor skeleton is activated.

15. The apparatus of any combination of claims 10-13, wherein the one or more processors are further configured to: determine a difference between the ground truth skeleton and the anchor skeleton in the case that the anchor skeleton is activated; estimate a pose of the ground truth skeleton based on the difference; and output the pose.

16. The apparatus of any combination of claims 10-15, wherein the anchor skeleton is defined by a plurality of key points.

17. The apparatus of any combination of claims 10-11, wherein to determine the difference between the ground truth skeleton and the anchor skeleton, the one or more processors are further configured to: determine the difference between the ground truth skeleton and each of the key points of the anchor skeleton.

18. The apparatus of any combination of claims 10-17, wherein the one or more processors are further configured to: process the determined one or more persons relative to the LiDAR sensor and the pose for each of the one or more persons using a non-maximum-suppression technique to remove duplicates of the one or more persons.

19. The apparatus of any combination of claims 10-18, wherein the apparatus comprises an automobile that includes the LiDAR sensor.

20. An apparatus configured to perform pose estimation, the apparatus comprising: means for receiving a point cloud from a LiDAR sensor, the point cloud including a plurality of points representing positions of objects relative to the LiDAR sensor; means for processing the point cloud to produce a voxelized frame including a plurality of voxels; means for processing the voxelized frame using a deep neural network to determine one or more persons relative to the LiDAR sensor and a pose for each of the one or more persons; and means for outputting a location of the determined one or more persons and the pose for each of the determined one or more persons.

21. An apparatus configured to perform pose estimation, the apparatus comprising means for performing any combination of steps in the processes of claims 1-9.

22. A non-transitory computer-readable medium may be configured to store instructions that, when executed, causes one or more processors to receive a point cloud from a LiDAR sensor, the point cloud including a plurality of points representing positions of objects relative to the LiDAR sensor, process the point cloud to produce a voxelized frame including a plurality of voxels, process the voxelized frame using a deep neural network to determine one or more persons relative to the LiDAR sensor and a pose for each of the one or more persons, and output a location of the determined one or more persons and the pose for each of the determined one or more persons.

In another example, this disclosure describes techniques for annotating point cloud data. In order to train a deep neural network to estimate a pose of a person in point cloud data, the deep neural network may be configured and modified through processing of a training set of point cloud data. The training set of point cloud data is previously-labeled with the exact location and poses of persons within the point cloud (e.g., through manual labeling). This previous labeling of poses in the point cloud data may be referred to as annotation. Techniques for annotating human pose in two-dimensional images exist. However, annotating point cloud data is considerably different. For one, point cloud data is three-dimensional. Furthermore, point cloud data is sparse in relation to two-dimensional image data.

This disclosure describes a method, apparatus, and software tool for annotating point cloud data. A user may use the techniques of this disclosure to annotate point clouds to label one or more poses found in the point cloud data. The annotated point cloud data may then be used to train a neural network to more accurately identify and label poses in point cloud data in real-time.

Figure 9:
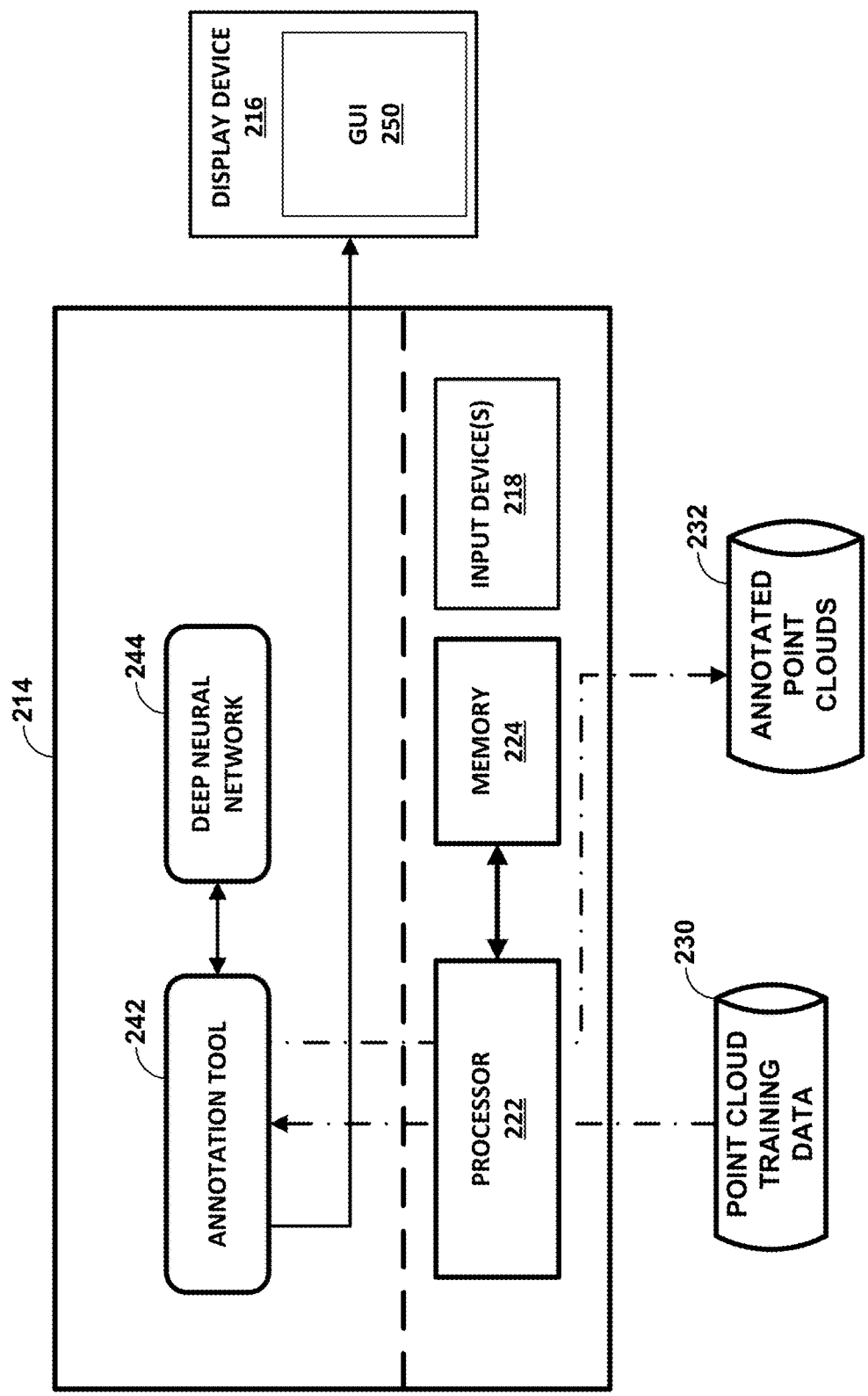
FIG. 9 is a block diagram illustrating an example apparatus configured to perform point cloud annotation according to the techniques of this disclosure.

FIG. 9 is a block diagram illustrating an example computing system 214 configured to perform the point cloud annotation techniques of this disclosure. Computing system 214 can be implemented with, for example, a desktop computer, notebook computer, tablet computer, or any type of computing device. Computing system 214 includes processor 222, a memory 224, and one or more input devices 218. In some examples, computing system 214 may include multiple processors 222.

Processor 222 may be implemented as fixed-function processing circuits, programmable processing circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Computing system 214 may be configured to generate information for display on display device 216. For example, as will be described in more detail below, computing system 214 may generate a graphical user interface (GUI) 250 and cause GUI 250 to be displayed on display device 216. A user may interact with GUI 250, e.g., through input device(s) 218 to annotate point cloud data. In some examples, display device 216 is part of computing system 214, and in other examples, display device 216 may be separate from computing system 214. Display device 216 can be implemented with any electronic display, for example a liquid crystal display (LCD), a light emitting diode (LED) display, or an organic light emitting diode (OLED) display.

Input devices 218 are devices configured to receive user commands or other information. In some examples, input devices 218 are part of computing system 214, and in other examples, input devices 218 may be separate from computing system 214. Input devices 218 may include any device for entering information or commands, for example a keyboard, microphone, cursor-control device, or touch screen.

In accordance with the techniques of this disclosure, processor 222 may be configured to execute a set of instructions of annotation tool 242 to perform point cloud annotation in accordance with the techniques of this disclosure. The instructions that define annotation tool 242 may be stored in memory 224. In some examples, the instructions that define annotation tool 242 may be downloaded to the memory 224 over a wired or wireless network.

In some examples, memory 224 may be a temporary memory, meaning that a primary purpose of memory 224 is not long-term storage. Memory 224 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Memory 224 may include one or more non-transitory computer-readable storage mediums. Memory 224 may be configured to store larger amounts of information than typically stored by volatile memory. Memory 224 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Memory 224 may store program instructions (e.g., annotation tool 242) and/or information (e.g., point cloud training data 230 and annotated point clouds 232) that, when executed, cause processor 222 to perform the techniques of this disclosure.

The following techniques of the disclosure will be described with reference to processor 222 executing various software modules. However, it should be understood that each of the software modules described herein may also be implemented in dedicated hardware, firmware, software, or any combination of hardware, software, and firmware.

In accordance with the techniques of this disclosure, processor 222, through the execution of annotation tool 242 may be configured to load point cloud training data 230. Point cloud training data 230 may include one or more frames of point cloud data, e.g., point cloud data captured by a LiDAR sensor or any other type of sensor that captures point cloud data. Annotation tool 242 may be configured to generate a GUI 250 that includes one or more frames of point cloud training data 230 and cause display device 216 to display GUI 250. A user may then interact with GUI 250 to annotate human poses onto a frame of point cloud training data 230 to define a pose of human that may be present in the point cloud data. After annotation, annotation tool 242 may be configured to output annotated point clouds 232. The annotated point clouds 232 may be stored in memory 224 and/or offloaded outside of computing system 214. Annotated point clouds 232 may then be used to train a deep neural network configured to estimate human poses from point cloud data (e.g., deep neural network 44 of FIG. 2). Deep neural network 244 of FIG. 9 represents a version of deep neural network 44 before and/or during the training process. FIGS. 10-14 illustrate various examples of GUI 250 that may be generated by annotation tool 242. The operation of annotation tool 242 relative to the generated GUI 250 and user inputs will be discussed in more detail below.

Figure 10:
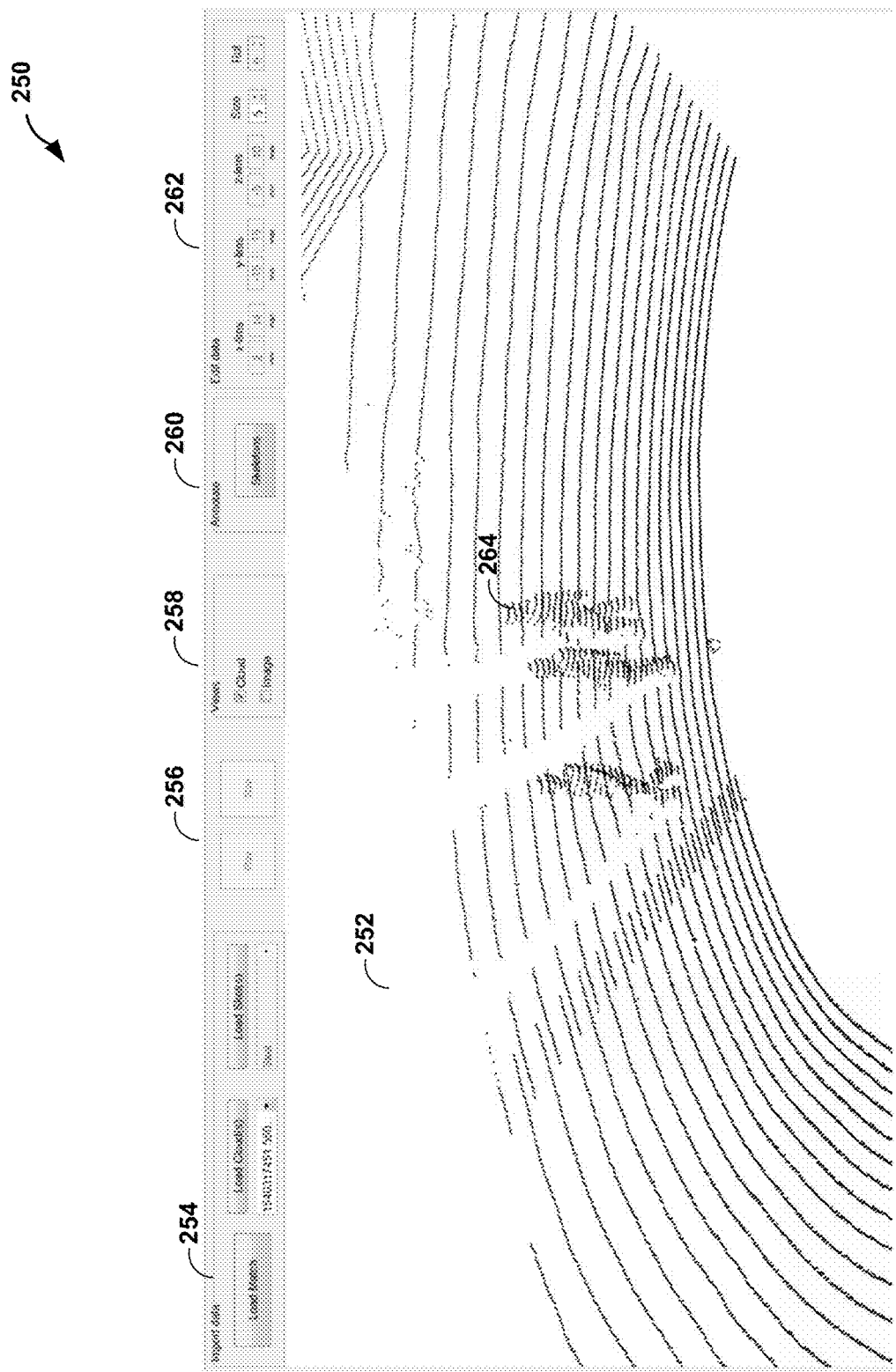
FIG. 10 is a conceptual user interface diagram showing an input point cloud for annotation.

FIG. 10 is a conceptual user interface diagram showing an input point cloud for annotation. Annotation tool 242 may cause display device 216 to display a GUI 250 that includes point cloud frame 252. For example, annotation tool 242 may generate a GUI 250 in response to a user input to load point cloud frame 252 of point cloud training data 230 (see FIG. 9). Annotation tool 242 may be configured to load and display point cloud frame 252 in response to a user interaction with import data controls 254. As shown in FIG. 10, point cloud frame 252 may include points 264 that may correspond to one or more persons captured in the point cloud data.

Import data controls 254 include a load match button, a load cloud(s) button, and a load Skel(s) (skeletons) button. When a user selects the load match button, annotation tool 242 opens a file explorer dialog box and reads the user selected file which contains a matching pairs of images and a point clouds from their corresponding directories. In this example, annotation tool 242 is able to load files from directories that include both an image and a matching point cloud. In this way, a paired image and point cloud may be viewed at the same time. In other examples, annotation tool 242 may only load one of an image or a point cloud.

When a user selects the load cloud(s) button, annotation tool 242 opens a file explorer dialog box and populates a list with the available point cloud files in the user selected directory. The user can then select which point cloud to view from the populated dropdown list.

When a user selects the load skel(s), annotation tool 242 opens a file explorer dialog box and loads any previously-annotated skeletons from a user selected file. The user can then edit any previously-annotated skeletons.

In some examples, annotation tool 242 may be configured to load multiple frames of point cloud training data 230 in response to a user input. Annotation tool may initially display a single point cloud frame 252 of the multiple frames. Annotation tool 242 may further generate one or more video controls 256 that cause annotation tool 242 to display each of the multiple frames of point cloud data in sequence (e.g., like a video). In the example of FIG. 10, video control buttons 256 include a play and stop button, though further controls may be provided in other examples (e.g., pause, rewind, fast forward, etc.).

Annotation tool 242 may further include edit data controls 262 in GUI 250. A user may interact with edit data controls 262 to change the amount or region of data of point cloud frame 252 that is displayed in GUI 250. A user may specify the region of point cloud frame 252 to be displayed by specifying minimum (min) and maximum (max) dimensions in a horizontal direction (x-lims), in a vertical direction (y-lims), and in a depth direction (z-lims). Annotation tool 242 may be configured to crop the point cloud frame 252 in response to user inputs in edit data controls 262 and display the cropped region of point cloud frame 252. Edit data controls 262 may further include a rotate (rot) button that changes the perspective angle at which point cloud frame 252 is viewed. The size button in edit data controls 262 changes the size of each point in the point cloud.

In the above example, a user, through manipulation of edit data controls 262, may use annotation tool 242 to manually crop a region of point cloud frame 252 to display. Cropping point cloud frame 252, e.g., around one or more potential persons in the data, may make annotating point cloud frame 252 easier. Rather than having a user manually crop point cloud frame 252, in other examples, annotation tool 242 may be configured to automatically identify regions of interest in point cloud frame 252 and automatically crop point cloud frame 252 to show only the identified regions of interest. In one example, annotation tool 242 may be configured to identify regions of interest by detecting which regions of point cloud frame 252 include data indicative of persons on which a pose may be annotated. In one example, annotation tool 242 may provide point cloud frame 242 to deep neural network 244 (FIG. 9) in order to identify the regions of interest. Deep neural network 244 may be a deep neural network that is configured to identify persons and estimate poses from point cloud data in the same manner as deep neural network 44 (see FIG. 2) described above. Deep neural network 244 may be a completed deep neural network configured for pose estimation or may be a deep neural network that is being trained with annotated point clouds 232 (see FIG. 9) produced by annotation tool 242. Deep neural network 244 may provide an indication of a region of interest to annotation tool 242 and annotation tool 242 may crop point cloud frame 252 of or around the indicated region of interest.

Figure 11:
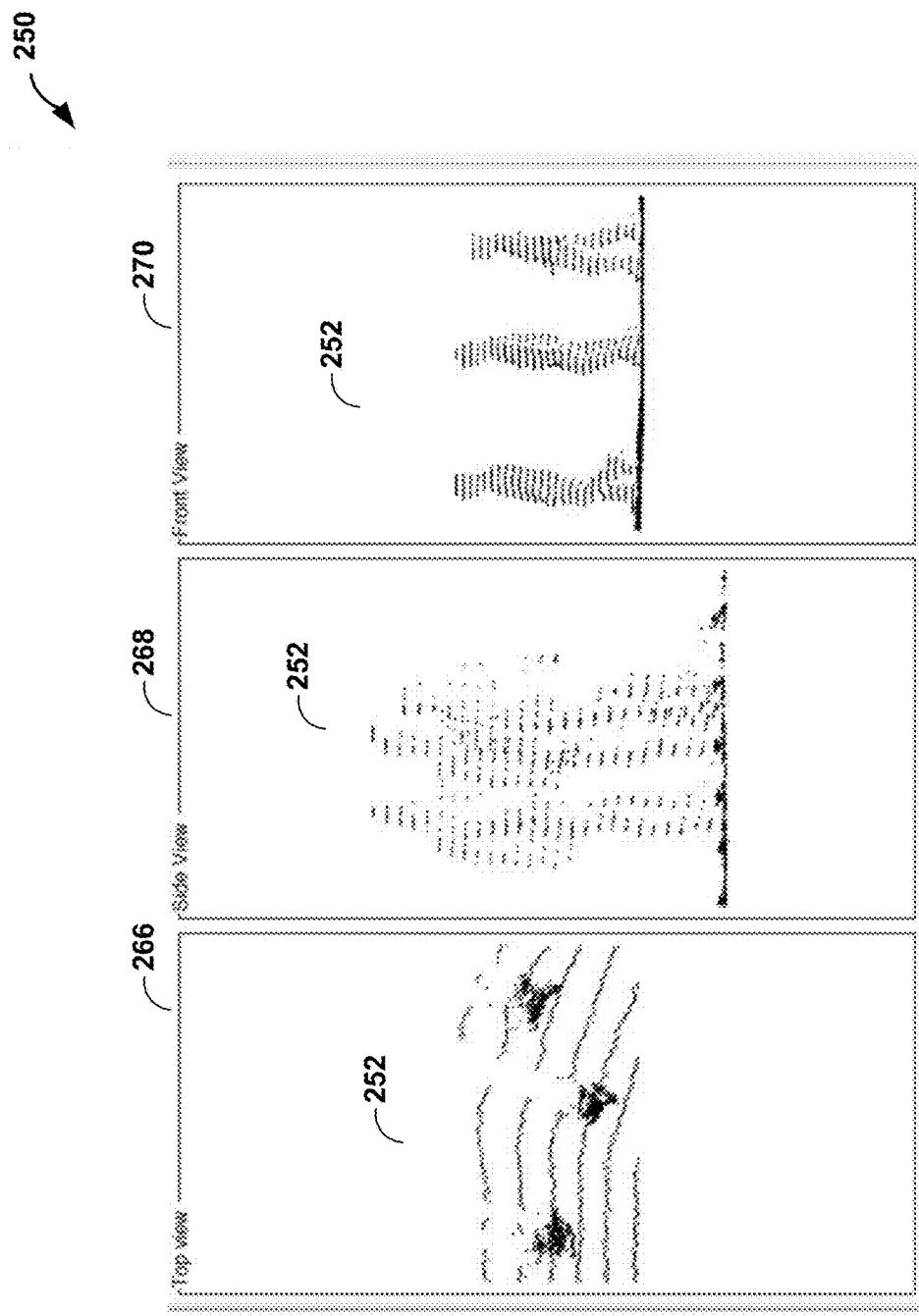
FIG. 11 is a conceptual user interface diagram showing a cropped point cloud for annotation.

FIG. 11 is a conceptual user interface diagram showing a cropped point cloud for annotation. In FIG. 11, annotation tool 242 displays a cropped region of point cloud frame 252 in top view window 266, side view window 268, and front view window 270, via GUI 250. In top view window 266, annotation tool 242 displays the cropped region of point cloud frame 252 from directly overhead. In side view window 268, annotation tool 242 displays the cropped region of point cloud frame 252 from an angle (e.g., 90 degrees) from a pre-defined front angle. In front view window 270, annotation tool 242 displays the cropped region of point cloud frame 252 from the pre-defined front angle. In other examples, annotation tool 242 may display the cropped region of point cloud frame 242 from more or fewer angles and/or perspectives, including isometric perspectives. Additionally, annotation tool 242 is not limited to displaying cropped regions of point cloud frame 252 at different angles. Annotation tool 242 may also display the entirety of cropped frame 252 at various angles.

Returning to FIG. 10, annotation tool 242 may further include annotate controls 260 (e.g., the button labeled "Skeletons"). When a user selects the "Skeletons" button of annotate controls 262, annotation tool 242 may label points in point cloud frame 252 with a plurality of annotation points. That is, annotation tool 242 may overlay a skeleton that is defined by a plurality of annotation points, where the plurality of annotation points corresponds to points on a human body.

Figure 12:
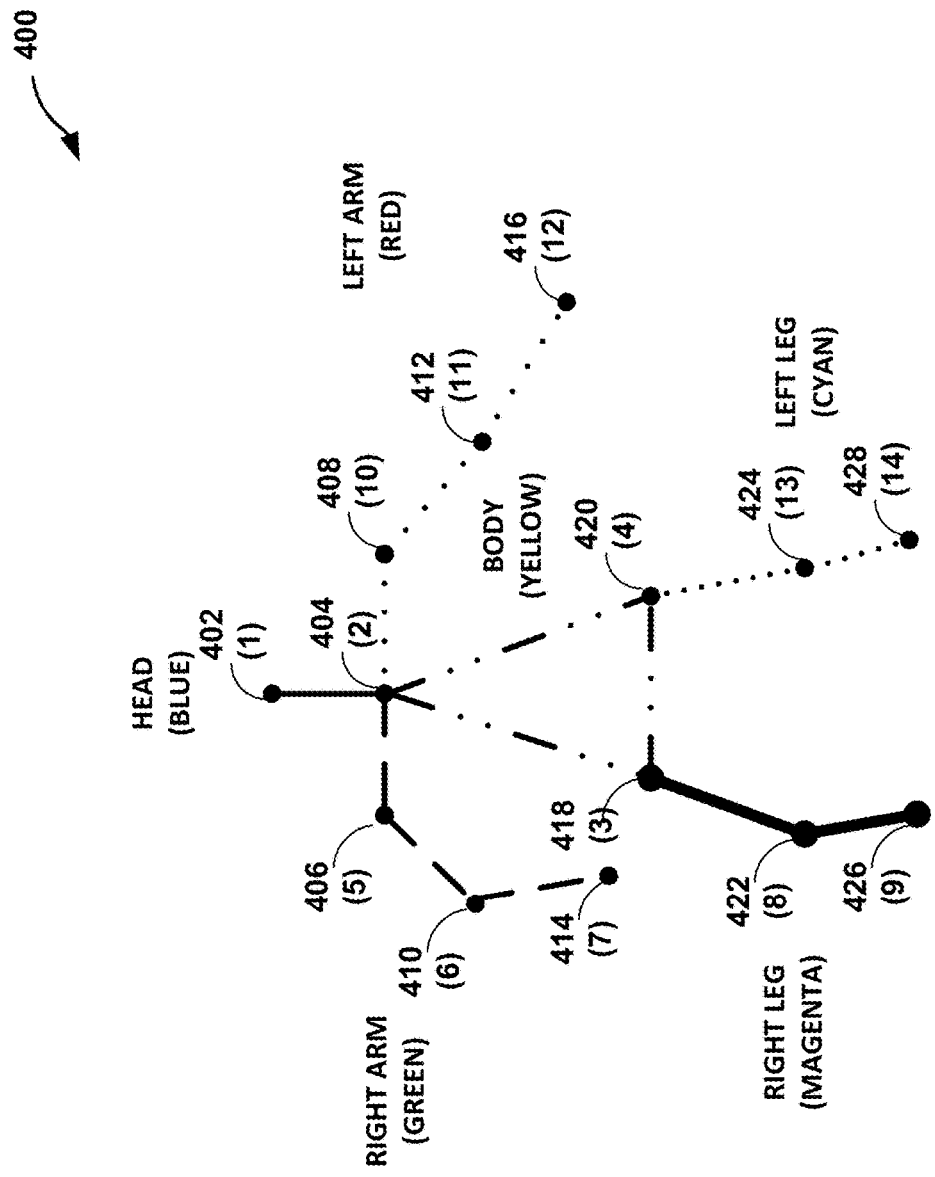
FIG. 12 is a conceptual diagram showing an example skeleton for annotation.

FIG. 12 is a conceptual diagram showing an example skeleton for annotation. Skeleton 400 represents an example skeleton that annotation tool 242 may use to label points of point cloud frame 252. In the example of FIG. 12, skeleton 400 is defined by 14 annotation points, each of which corresponds to a human joint or other human anatomy. In other examples, skeleton 400 may include more or fewer annotation points. As will be explained below, a user may manipulate and move one or more the annotation points of skeleton 400 to define a pose of a person represented by the points in point cloud frame 242.

In FIG. 12, skeleton 400 is facing toward the viewer. As such, the "right-side" limbs are shown on the left side of FIG. 12. Skeleton 400 is defined by top of head annotation point 402 (1), center of neck annotation point 404 (2), left shoulder annotation point 408 (10), right shoulder annotation point 406 (5), left elbow annotation point 412 (11), right elbow annotation point 410 (6), left hand annotation point 416 (12), right hand annotation point 414 (7), left hip annotation point 420 (4), right hip annotation point 418 (3), left knee annotation point 424 (13), right knee annotation point 422 (8), left foot annotation point 428 (14), and right foot annotation point 426 (9). The numbers in parentheses next to reference numerals of the annotation points relate to selection buttons of annotation tool 242 that will be shown in FIG. 13 and FIG. 14.

In addition to displaying the various annotation points of skeleton 400, annotation tool 242 may also display lines between the annotation points to define limbs and/or major body parts of skeleton 400. For example, annotation tool 242 may display a line between top of head annotation point 402 and center of neck annotation point 404 to define a head. Annotation tool 242 may display a line extending from center of neck annotation point 404, through right shoulder annotation point 406 and right elbow annotation point 410, and ending at right hand annotation point 414 to define a right arm. Annotation tool 242 may display a line extending from center of neck annotation point 404, through left shoulder annotation point 408 and left elbow annotation point 412, and ending at left hand annotation point 416 to define a left arm. Annotation tool 242 may display a line from center of neck annotation point 404, to left hip annotation point 420, to right hip annotation pint 418, and back to center of neck annotation point 404 to define a body. Annotation tool 242 may display a line from right hip annotation point 418, to right knee annotation point 422, and ending at right foot annotation point 426 to define a right leg. Annotation tool 242 may display a line from left hip annotation point 420, to left knee annotation point 424, and ending at left foot annotation point 428 to define a right leg.

As shown in FIG. 12, annotation tool 242 may use different line weights and/or dash types for the different limbs. In this way, a user may more easily distinguish the limbs of skeleton 400 from each other in order to select the appropriate annotation point for manipulation. In other examples, rather than use line weights or dash types, annotation tool 242 may use different colors to distinguish the different limbs. For example, the lines between annotation points defining the head may be blue, the lines between annotation points defining the right arm may be green, the lines between annotation points defining the left arm may be red, the lines between annotation points defining the body may be yellow, the lines between annotation points defining the right leg may be magenta, and the lines between annotation points defining the left leg may be cyan. Of course, other colors may be used.

Figure 13:
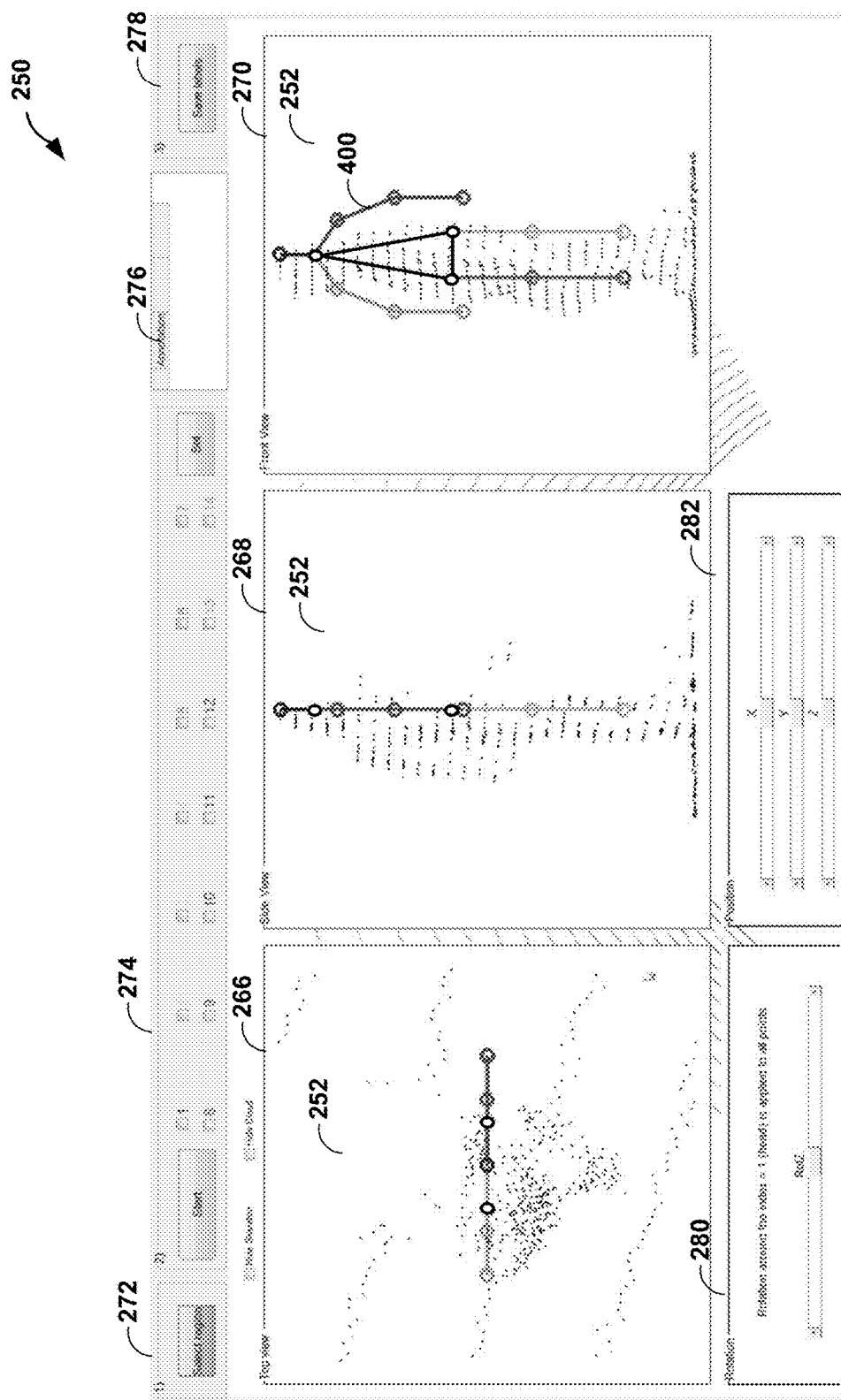
FIG. 13 is a conceptual user interface diagram showing an estimated annotation of the point cloud.

FIG. 13 is a conceptual user interface diagram showing an estimated annotation of a point cloud. In FIG. 13, annotation tool 242 labels points in point cloud frame 252 with the annotation points of skeleton 400. Annotation tool 242 shows skeleton 400 in each of top view 266, side view 268, and front view 270, in GUI 250. Initially, annotation tool 242 may display skeleton 400 in a default position and in a default pose. As can be seen in FIG. 13, the default position of skeleton 400 does not match the actual pose of the person depicted in the point cloud data of point cloud frame 252. A user may manipulate and/or move one or more of the annotation points of skeleton 400 to match the actual pose of one or more persons present in the data of point cloud frame 252 to produce an annotated point cloud.

In the example of FIG. 13, annotation tool 242 displays a single skeleton 400. In other examples, annotation tool 242 may generate and display multiple skeletons if there are multiple poses to be annotated in point cloud frame 242. In one example, annotation tool 242 may position skeleton 400 in a default position, e.g., in the center of each view. In other examples, a user may manually position skeleton 400 (e.g., through moving all annotation points together) into a position. In other examples, annotation tool 242 may automatically determine a location of one or more persons in point cloud frame 252 and position skeleton 400 at the automatically determined location. In one example, annotation tool 242 may provide point cloud frame 242 to deep neural network 244. Deep neural network 244 may be a deep neural network that is configured to estimate poses in the same manner as deep neural network 44 (see FIG. 2) described above. Deep neural network 244 may be a completed deep neural network configured for pose estimation or may be a deep neural network that is being trained with annotated point clouds 232 (see FIG. 9) produced by annotation tool 242. Deep neural network 244 may determine the locations of persons in point cloud frame 252 and indicate the position or positions of such person(s) to annotation tool 242. Annotation tool 242 may then display the default skeleton 400 at the position indicated by deep neural network 244.

Annotation tool 242 may also display skeleton 400 having a default pose. That is, annotation tool 242 may display the annotation points of skeleton in a default orientation relative to each other. FIG. 13 shows one example of a default pose of skeleton 400. Of course, annotation tool 242 may generate other default poses. In other examples, rather than using a default pose, annotation tool 242 may estimate a position and pose of a person in point cloud frame 252. In one example, annotation tool 242 may provide point cloud frame 242 to deep neural network 244. Deep neural network 244 may be a deep neural network that is configured to estimate poses in the same manner as deep neural network 44 (see FIG. 2) described above. Deep neural network 244 may be a completed deep neural network configured for pose estimation or may be a deep neural network that is being trained with annotated point clouds 232 (see FIG. 9) produced by annotation tool 242. Deep neural network 244 may determine an estimated position and pose of persons found in point cloud frame 252 and indicate the position and pose of such persons to annotation tool 242.

Annotation tool 242 may then display the default skeleton 400 at the position and pose indicated by deep neural network 244. Such estimated poses will often not be completely accurate. However, the estimated pose produced by deep neural network 244 may be closer to the actual pose found in the point cloud data than a default pose. Accordingly, a user of annotation tool 244 may start with a pose that is closer to the actual pose to be annotated, thus making the manual process for annotating the pose easier and faster.

Annotation tool 242 may provide several different tools for a user to manipulate skeleton 400 into a position representing the actual pose the person found in point cloud frame 252. Annotation tool 242 may generate a select region button 272. A user may activate select region button 272 and then select which of top view 266, side view 268, or front view 270 that the user will interact with. Manipulation of skeleton 400 may be easier in different views depending on the position and orientation of persons captured in point cloud frame 252. Annotation point controls 274 allow a user to select particular annotation points to control. The numbers 1-14 of the checkboxes in annotation point controls 274 correspond to the numbers in parenthesis of the annotation points shown in FIG. 12. A user may select one or more of the annotation points by selecting a corresponding checkbox. Annotation tool 242 may then move, in response to a user input, one or more of the selected annotation points to define a human pose and create annotated point cloud data 232 (see FIG. 9).

In one example, annotation tool 242 may move a selected annotation point in response to a user interaction with a mouse (e.g., click and drag). In other examples, annotation tool 242 may move one or more of the annotation points in response to user interaction with rotation control 280 and/or position control 282. In the example of FIG. 13, rotation control 280 is a slider control that causes annotation tool 242 to rotate all annotation points of skeleton 400 around the top of head annotation point. Position control 282 includes individual sliders for each of the horizontal (X), vertical (Y), and depth (Z) dimensions of point cloud frame 252. In response to a user moving the sliders, annotation tool 242 moves the selected annotation points in each of the specified dimensions within point cloud frame 252. While the example of FIG. 13 shows slider controls, other control types may be used, including text entry of specific coordinates (e.g., (X,Y,Z,) coordinates) within point cloud frame 252.

In one example of the disclosure, annotation tool 242 may assign a unique identifier to each annotation point in a skeleton. In this way, the pose and annotation points of a particular skeleton may be tracked across multiple frames. Furthermore, in conjunction with the action recognition techniques discussed above, annotation tool 242 may also include an action category label per frame and per skeleton (e.g., human pose).

In one example of the disclosure, to increase precision of positioning annotation points, annotation tool 242 may be configured to only allow the selection of a single annotation point at a time. Once the single annotation point is selected, a user may only cause annotation tool 242 to move the single selected annotation point. For example, once one of the checkboxes annotation points controls 274 is selected, annotation tool 242 may make the other checkboxes unavailable for selection. To move other annotation points, a user may first deselect the selected annotation point. While moving a single selected annotation point, annotation tool 242 leaves all other annotation points stationary. In other examples, annotation tool 242 may allow for the selection of multiple annotation points. In this example, annotation tool 242 will only move the selected annotation points (e.g., one or multiple selected annotation points) in response to user input. The non-selected annotation points will remain stationary.

That is, in one example, annotation tool 242 receives a selection of a single annotation point of the plurality of annotation points, and moves, in response to the user input, only the single selected annotation point to define a portion of the human pose. In other examples, annotation tool 242 receives a selection of two or more annotation points of the plurality of annotation points, and moves, in response to the user input, only the two or more selected annotation points to define a portion of the human pose. A user may type notes regarding the annotated point cloud frame 252 in annotation window 276. Once annotation is completed, a user may active save controls 278 to save the final position of each annotation point. The annotated point cloud 232 (see FIG. 9) may then be saved in memory (e.g., in a .json file) and then used for training a neural network (e.g., neural network 244).

Figure 14:
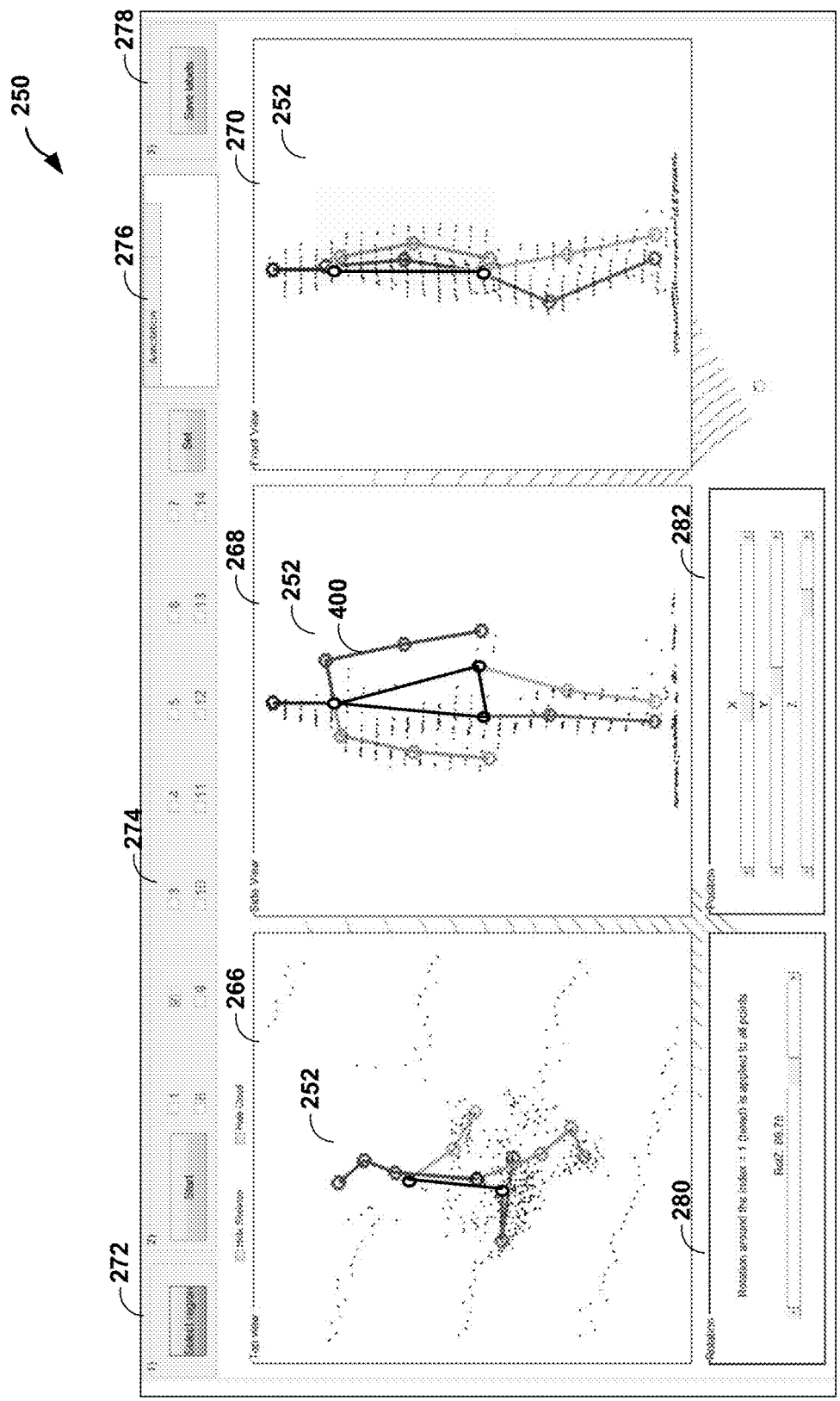
FIG. 14 is a conceptual user interface diagram showing an annotated point cloud.

FIG. 14 is a conceptual user interface diagram showing an annotated point cloud. FIG. 14 shows the pose of skeleton 400 from FIG. 13 after manipulation by a user. As can be seen in FIG. 14, the annotation points of skeleton 400 have been moved into a position (i.e., a pose) that more closely matches the actual pose of the person capture in point cloud 252.

Figure 15:
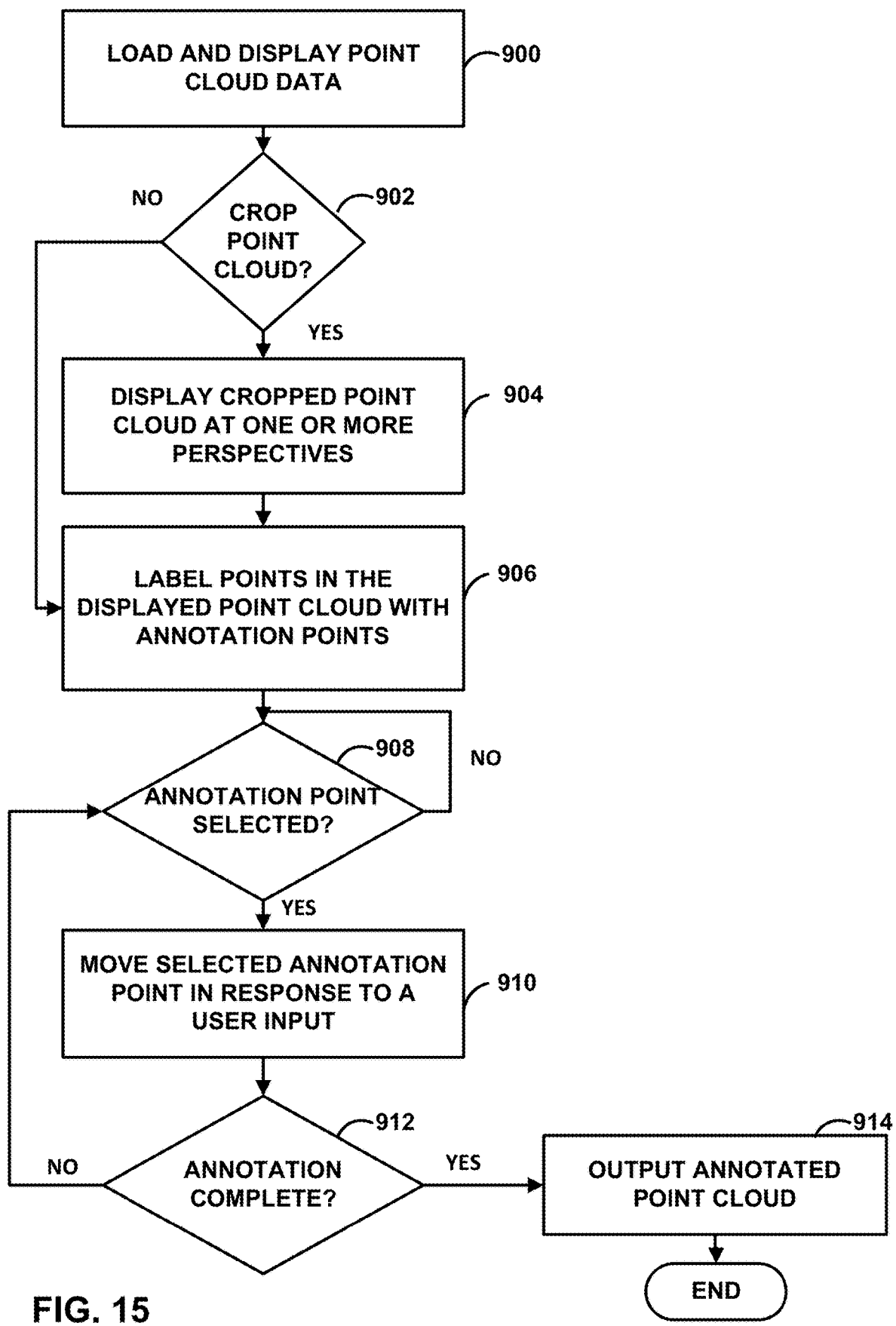
FIG. 15 is a flowchart illustrating an example operation an annotation tool in accordance with one example of the disclosure.

FIG. 15 is a flowchart illustrating an example operation an annotation tool in accordance with one example of the disclosure. The techniques in FIG. 15 may be performed by processor 222 executing instructions for annotation tool 242 (see FIG. 9). The techniques of FIG. 15 depict one example process for annotating a single frame of point cloud data. The process of FIG. 15 may be repeated for multiple frames of point cloud data.

Annotation tool 242 may load and display point cloud data (900). For example, annotation tool 242 may load point cloud data from a point cloud file (e.g., point cloud training data 230 of FIG. 9), and may cause display device 216 to display a GUI 250 that includes the loaded point cloud data. Annotation tool 242 may then determine, either automatically or through a user input, whether or not to crop the point cloud (902). If yes, annotation tool 902 displays the cropped point cloud at one or more perspectives (904). Annotation tool 904 may label points in the displayed point cloud (e.g., the cropped point cloud) with annotation points (906). If the point cloud data is not cropped (902), annotation tool 904 also labels points in the displayed point cloud (e.g., the entire point cloud) with annotation points (906).

Annotation tool 242 then waits until an annotation point is selected (908). Once an annotation point is selected, annotation tool 242 will then move the selected annotation point in response to a user input (910). Annotation tool 242 will then check for a user input indicating that the annotation is complete (912). If yes, annotation tool 242 outputs the annotated point cloud (914). If no, annotation tool 242 will wait for another annotation point to be selected (908) and then repeat the move process (910) in response to user inputs.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Any changes and/or modifications to the methods and apparatus of the techniques disclosed which are known to a person of ordinary skill in the art are within the scope of invention. Various examples of the invention have been described. These and other embodiments are within the scope of the following claims.

What is claimed is:

1. A method comprising:
   causing, by one or more processors, display of at least one frame of multiple frames of point cloud data;
   labeling, by the one or more processors, points in the at least one frame of the point cloud data with a plurality of annotation points, the plurality of annotation points corresponding to points on a human body;
   causing, by the one or more processors, a video display of the multiple frames of the point cloud data, wherein the video display may be controlled to be forward, fast forward, pause, and reverse;
   moving, by the one or more processors, and in response to a user input, one or more of the annotation points to define a human pose and create annotated point cloud data; and
   outputting, by the one or more processors, the annotated point cloud data for training by a neural network.

2. The method of claim 1, wherein labeling, by the one or more processors, points in the at least one frame of the point cloud data with the plurality of annotation points comprises:
   estimating, by the one or more processors, a position of a potential human pose in the at least one frame of the point cloud data; and
   labeling, by the one or more processors, the annotation points to correspond with the estimated position of the potential human pose.

3. The method of claim 1, wherein moving, by the one or more processors, and in response to the user input, one or more of the annotation points to define the human pose and create annotated point cloud data comprises:
   receiving, by the one or more processors, a selection of a single annotation point of the plurality of annotation points;
   moving, by the one or more processors, and in response to the user input, only the single annotation point to define a portion of the human pose.

4. The method of claim 1, wherein moving, by the one or more processors, and in response to the user input, one or more of the annotation points to define the human pose and create annotated point cloud data comprises:
   receiving, by the one or more processors, a selection of two or more annotation points of the plurality of annotation points;
   moving, by the one or more processors, and in response to the user input, only the two or more annotation points to define a portion of the human pose.

5. The method of claim 1, further comprising:
   displaying an image that corresponds to the at least one frame of the point cloud data at the same time as displaying the point cloud data;
   cropping, by the one or more processors, the point cloud data and the image around a region of a potential human pose in the point cloud data; and
   causing, by the one or more processors, display of the cropped region.

6. The method of claim 5, further comprising:
   causing, by the one or more processors, display of the cropped region at a plurality of perspectives.

7. The method of claim 1, wherein the plurality of annotation points includes annotation points corresponding to a top of a head, a center of a neck, a right hip, a left hip, a right shoulder, a right elbow, a right hand, a right knee, a right foot, a left shoulder, a left elbow, a left hand, a left knee, and a left foot, and wherein groups of the annotation points correspond to limbs of a person, the method further comprising:
   causing, by the one or more processors, display of lines between the annotation points to define the limbs, including displaying different limbs using different colors.

8. The method of claim 1, further comprising:
   adding, by the one or more processors, an action label for each of the multiple frames of the point cloud data and to the human pose.

9. The method of claim 1, further comprising:
   training, by the one or more processors, the neural network with the annotated point cloud data, wherein the neural network is configured to estimate a pose of a person from LiDAR point cloud data.

10. An apparatus comprising:
    a memory configured to store point cloud data; and
    one or more processors in communication with the memory, the one or more processors configured to:
        cause display of at least one frame of multiple frames of the point cloud data;
        label points in the at least one frame of the point cloud data with a plurality of annotation points, the plurality of annotation points corresponding to points on a human body;
        cause a video display of the multiple frames of the point cloud data, wherein the video display may be controlled to be forward, fast forward, pause, and reverse;
        move, in response to a user input, one or more of the annotation points to define a human pose and create annotated point cloud data; and
        output the annotated point cloud data for training by a neural network.

11. The apparatus of claim 10, wherein to label points in the at least one frame of the point cloud data with the plurality of annotation points, the one or more processors are further configured to:

estimate a position of a potential human pose in the at least one frame of the point cloud data; and label the annotation points to correspond with the estimated position of the potential human pose.

12. The apparatus of claim 10, wherein to move, in response to the user input, one or more of the annotation points to define the human pose and create annotated point cloud data, the one or more processors are further configured to:

receive a selection of a single annotation point of the plurality of annotation points;

move, in response to the user input, only the single annotation point to define a portion of the human pose.

13. The apparatus of claim 10, wherein to move, in response to the user input, one or more of the annotation points to define the human pose and create annotated point cloud data, the one or more processors are further configured to:

receive a selection of two or more annotation points of the plurality of annotation points;

move, in response to the user input, only the two or more annotation points to define a portion of the human pose.

14. The apparatus of claim 10, wherein the one or more processors are further configured to:

display an image that corresponds to the at least one frame of the point cloud data at the same time as displaying the point cloud data;

crop the point cloud data and the image around a region of a potential human pose in the point cloud data; and cause display of the cropped region.

15. The apparatus of claim 14, wherein the one or more processors are further configured to:

cause display of the cropped region at a plurality of perspectives.

16. The apparatus of claim 10, wherein the plurality of annotation points include annotation points corresponding to a top of a head, a center of a neck, a right hip, a left hip, a right shoulder, a right elbow, a right hand, a right knee, a right foot, a left shoulder, a left elbow, a left hand, a left knee, and a left foot, and wherein groups of the annotation points correspond to limbs of a person, and wherein the one or more processors are further configured to:

cause display of lines between the annotation points to define the limbs, including cause display of different limbs using different colors.

17. The apparatus of claim 10, wherein the one or more processors are further configured to:

add an action label for each of the multiple frames of the point cloud data and to the human pose.

18. The apparatus of claim 10, wherein the one or more processors are further configured to:

train the neural network with the annotated point cloud data, wherein the neural network is configured to estimate a pose of a person from LiDAR point cloud data.

19. An apparatus comprising:

means for causing display of at least one frame of multiple frames of point cloud data;

means for labeling points in the at least one frame of the point cloud data with a plurality of annotation points, the plurality of annotation points corresponding to points on a human body;

means for causing a video display of the multiple frames of the point cloud data, wherein the video display may be controlled to be forward, fast forward, pause, and reverse;

means for moving, in response to a user input, one or more of the annotation points to define a human pose and create annotated point cloud data; and means for outputting the annotated point cloud data for training by a neural network.

20. A non-transitory computer-readable storage medium storing instructions that, when executed, cause one or more processors to:

cause display of at least one frame of multiple frames of point cloud data;

label points in the at least one frame of the point cloud data with a plurality of annotation points, the plurality of annotation points corresponding to points on a human body;

cause a video display of the multiple frames of the point cloud data, wherein the video display may be controlled to be forward, fast forward, pause, and reverse;

move, in response to a user input, one or more of the annotation points to define a human pose and create annotated point cloud data; and output the annotated point cloud data for training by a neural network.

* * * * *